US009899913B2

(12) United States Patent
Chang

(10) Patent No.: US 9,899,913 B2
(45) Date of Patent: Feb. 20, 2018

(54) DUAL-MODE SWITCHING D.C.-TO-D.C. CONVERTER AND METHOD OF CONTROLLING THE SAME

(71) Applicant: Samsung Electronics Co., Ltd., Suwon-Si, Gyeonggi-Do (KR)

(72) Inventor: Ji-Soo Chang, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 528 days.

(21) Appl. No.: 14/514,768

(22) Filed: Oct. 15, 2014

(65) Prior Publication Data

US 2015/0200592 A1 Jul. 16, 2015

Related U.S. Application Data

(60) Provisional application No. 61/925,736, filed on Jan. 10, 2014.

(30) Foreign Application Priority Data

May 9, 2014 (KR) ........................ 10-2014-0055662

(51) Int. Cl.
   *H02M 3/156* (2006.01)
(52) U.S. Cl.
   CPC .... *H02M 3/156* (2013.01); *H02M 2003/1566* (2013.01)
(58) Field of Classification Search
   CPC .. H02M 3/156; H02M 3/1588; H02M 3/1584; H02M 3/158; H02M 3/157; H02M 3/33507; H02M 3/1563; Y02B 70/1466
   (Continued)

(56) References Cited

U.S. PATENT DOCUMENTS 7,259,473 B2   8/2007 Petricek
7,999,528 B2   8/2011 Chen et al.
(Continued)

FOREIGN PATENT DOCUMENTS

KR   10-2013-0035242 A   4/2013

OTHER PUBLICATIONS

J. Chang, "Fast Transient Response PWM Buck Converter with Duty Ratio-Based Dual-Mode Control" published in IIISC (International Industrial Information Systems Conference) on Jan. 21-24, 2014, 3pgs, Suwon, Korea.
(Continued)

*Primary Examiner* — Jue Zhang
*Assistant Examiner* — Kevin H Sprenger
(74) *Attorney, Agent, or Firm* — Harness, Dickey & Pierce, P.L.C.

(57) ABSTRACT

A dual-mode switching D.C.-to-D.C. converter includes a power conversion unit and a switch driver. The power conversion unit generates a D.C. output voltage based on a switch driving signal and a D.C. input voltage. The switch driver performs frequency compensation on the D.C. output voltage to generate a feedback voltage, and compares the feedback voltage with a comparison input signal to generate a pulse-width-modulated signal. The switch driver compares the D.C. output voltage with a first reference voltage to generate a comparison output signal. The switch driver generates the switch driving signal based on the pulse-width-modulated signal in a normal operation mode, and generates the switch driving signal based on the comparison output signal in an abnormal operation mode. The normal operation mode and the abnormal operation mode are based on a load current flowing through a load connected to the switching D.C.-to-D.C. converter.

19 Claims, 16 Drawing Sheets

(58) Field of Classification Search
USPC .................................... 323/282–286, 288
See application file for complete search history.

(56) References Cited

U.S. PATENT DOCUMENTS

| | | | | |
|---|---|---|---|---|
| 8,044,649 | B2 | 10/2011 | Schmeller et al. | |
| 8,102,164 | B2* | 1/2012 | Colbeck | H02M 1/4225 323/271 |
| 8,217,637 | B2* | 7/2012 | Tsui | H02M 3/156 323/282 |
| 8,513,935 | B2* | 8/2013 | Brokaw | H02M 3/156 323/283 |
| 8,786,269 | B2* | 7/2014 | Menegoli | H02M 3/156 323/282 |
| 2008/0136342 | A1* | 6/2008 | Tamegai | H02M 1/32 315/209 R |
| 2010/0033215 | A1* | 2/2010 | Fogg | H03K 4/50 327/137 |
| 2011/0127980 | A1* | 6/2011 | Chen | H02M 3/156 323/282 |

OTHER PUBLICATIONS

H. Huang, "Dithering Skip Modulation, Width and Dead Time Controllers in Highly Efficient DC-DC Converters for System-On-Chip Applications" published in Solid-State Circuits, IEEE Journal of (vol. 42 , issue: 11), Nov. 2007, 15pgs.

P. Wu, "Area-and Power-Efficient Monolithic Buck Converters With Pseudo-Type III Compensation" published in Solid-State Circuits, IEEE Journal of (vol. 45 , Issue: 8), Aug. 2010, 10pgs.

F. Luo, "An Integrated Switching DC-DC Converter With Dual-Mode Pulse-Train/PWM Control" published in Circuits and Systems II: Express Briefs, IEEE Transactions on vol. 56 , Issue: 2), Feb. 2009, 5pgs.

P. Liu, "A High-Efficiency CMOS DC-DC Converter With 9-s Transient Recovery Time" published in Circuits and Systems I: Regular Papers, IEEE Transactions on (vol. 59 , Issue: 3), Mar. 2012, 9pgs.

Dr. Y. Jung, "2014 International industrial Information Systems Conference", Jan. 21-24, 2014 Chiang Mai, Thailand,1page.

* cited by examiner

DUAL-MODE SWITCHING D.C.-TO-D.C. CONVERTER AND METHOD OF CONTROLLING THE SAME

CROSS-REFERENCE TO RELATED APPLICATION

This application claims the benefit of provisional U.S. application No. 61/925,736 filed on Jan. 10, 2014 and also claims priority under 35 U.S.C. § 119 to Korean Patent Application No. 10-2014-0055662 filed on May 9, 2014, the disclosures of each of which are hereby incorporated by reference in their entirety.

BACKGROUND

Field

At least one example embodiment of the inventive concepts relates to a power converter, and particularly, to a switching D.C.-to-D.C. converter.

Description of Related Art

Recently, energy savings have been in high demand due to environmental reasons. In a mobile information processing device such as a cellular phone or a personal-digital-assistant (PDA) that uses a battery, reducing power consumption becomes an important issue. A switch mode power supply such as a step-down converter, a boost converter, or a buck-boost converter is widely used in a variety of electronic systems.

SUMMARY

At least one example embodiment of the inventive concepts provides a switching D.C.-to-D.C. converter capable of generating a stable D.C. output voltage even when a load is changed.

At least one example embodiment of the inventive concepts provides a method of controlling a switching D.C.-to-D.C. converter capable of generating a stable D.C. output voltage even when a load is changed.

The inventive concepts are not limited to the above objectives; other objectives may become apparent to those of ordinary skill in the art based on the following descriptions.

According to at least one example embodiment of inventive concepts, a switching D.C.-to-D.C. converter may include a power conversion unit and a switch driver.

The power conversion unit generates a D.C. output voltage based on a switch driving signal and a D.C. input voltage. The switch driver performs frequency compensation on the D.C. output voltage to generate a feedback voltage, compares the feedback voltage with a comparison input signal to generate a pulse-width-modulated signal, compares the D.C. output voltage with a reference voltage to generate a comparison output signal, generates the switch driving signal based on the pulse-width-modulated signal in a normal operation mode, and generates the switch driving signal based on the comparison output signal in an abnormal operation mode. The normal operation mode and the abnormal operation mode may be based on a load current flowing through a load connected to the switching D.C.-to-D.C. converter.

According to at least one example embodiment, the comparison input signal may include a ramp signal.

According to at least one example embodiment, the abnormal operation may be a mode in which a transient change in the D.C. output voltage occurs due to a change in the load current. The normal operation mode may be a mode in which the level of the D.C. output voltage is constant due to the load current being constant.

According to at least one example embodiment, the switching D.C.-to-D.C. converter may include a buck converter.

According to at least one example embodiment, the power conversion unit may include a first power switch, a second power switch, an inductor, and a capacitor.

The first power switch is connected between a first node and a second node, and operates in response to a first driving signal. The second power switch is connected between the second node and a ground voltage, and operates in response to a second driving signal. The inductor is connected between the second node and an output node, and the capacitor is connected between the output node and the ground voltage.

According to at least one example embodiment, the switch driver may include a voltage divider, a signal generator, a frequency compensation circuit, a first comparator, a transient-response feedback circuit, a selecting circuit, and a gate driver.

The voltage divider divides the D.C. output voltage to generate a voltage signal. The signal generator generates a duty signal based on the D.C. input voltage and the reference voltage. The D.C. input voltage may have a duty ratio that changes according to a ramp signal, a clock signal, and the D.C. input voltage. The frequency compensation circuit performs the frequency compensation on the voltage signal to generate the feedback voltage. The first comparator compares the feedback voltage with the ramp signal to generate the pulse-width-modulated signal. The transient-response feedback circuit compares the D.C. output voltage with the reference voltage to generate the comparison output signal, and generates a transient-response control signal based on the clock signal, the duty signal, the pulse-width-modulated signal, and the comparison output signal. The selecting circuit selects one of the pulse-width-modulated signal and the comparison output signal in response to the transient-response control signal, and outputs the selected signal as a gate control signal. The gate driver generates the switch driving signal based on the gate control signal.

According to at least one example embodiment, the signal generator may include a second comparator, a third comparator, a flip-flop, and a fourth comparator.

The second comparator compares the ramp signal with a lower limit to generate a first comparison output. The third comparator compares the ramp signal with an upper limit to generate a second comparison output. The flip-flop generates the clock signal based on the first comparison output and the second comparison output. The fourth comparator compares the ramp signal with the voltage signal, and generates the duty signal. The duty ratio may vary according to the D.C. input voltage.

According to at least one example embodiment, the transient-response feedback circuit may include a second comparator and a transient-response control circuit.

The second comparator compares the D.C. output voltage with the first reference voltage to generate the comparison output signal. The transient-response control circuit generates the transient-response control signal based on the clock signal, the duty signal, the pulse-width-modulated signal, and the comparison output signal.

According to at least one example embodiment, the transient-response feedback circuit may detect the comparison output signal using the clock signal, and detect the pulse-width-modulated signal using the duty signal.

According to at least one example embodiment, the transient-response feedback circuit may enable the transient-response control signal if a pulse of the comparison output signal is not generated for one period of the clock signal.

According to at least one example embodiment, the selecting circuit may output the comparison output signal as the gate control signal if the transient-response control signal is enabled, and output the pulse-width-modulated signal as the gate control signal if the transient-response control signal is disabled.

According to at least one example embodiment, the transient-response feedback circuit enables the transient-response control signal such that the switching D.C.-to-D.C. converter has a desired transient-response characteristic.

According to at least one example embodiment, and the transient-response feedback circuit samples the pulse-width-modulated signal at a rising edge of the duty signal, and if the sampling result indicates that a logic state of the pulse-width-modulated signal changes from a first state to a second state, disables the transient-response control signal.

According to at least one example embodiment, the normal operation mode is a mode in which the transient-response control signal is disabled.

According to at least one example embodiment, a duty ratio of the duty signal may be adjusted.

According to at least one example embodiment, the duty ratio of the duty signal may be determined based on the D.C. input voltage and the reference voltage.

According to at least one example embodiment, the transient-response feedback circuit may include a pre-amplifier, a second comparator, and a duty-based transient-response control circuit.

The pre-amplifier amplifies a difference between the D.C. output voltage and the reference voltage to generate a differential output signal pair. The second comparator compares signals of the differential output signal pair to each other to generate the comparison output signal. The transient-response control circuit generates the transient-response control signal based on the clock signal, the duty signal, the pulse-width-modulated signal, and the comparison output signal.

According to at least one example embodiment of inventive concepts, a method of controlling a switching D.C.-to-D.C. converter may include performing a frequency compensation on a D.C. output voltage to generate a first feedback voltage; comparing the feedback voltage with a comparison input signal to generate a pulse-width-modulated signal; comparing the D.C. output voltage with a reference voltage to generate a comparison output signal; generating a switch driving signal based on the pulse-width-modulated signal in a normal operation mode, and generating the switch driving signal based on the comparison output signal in an abnormal operation mode; and generating the D.C. output voltage based on the switch driving signal and the D.C. input voltage. The normal operation mode and the abnormal operation mode may be based on a load current flowing through a load connected to the switching D.C.-to-D.C. converter.

According to at least one example embodiment, the generating a switch driving signal may include detecting a rising edge of the comparison output signal for one cycle of a clock signal; determining whether the rising edge of the comparison output signal exists; if the rising edge of the comparison output signal exists, disabling a transient-response control signal, and controlling a duty cycle of the switch driving signal based on the pulse-width-modulated signal; if the rising edge of the comparison output signal does not exist, enabling the transient-response control signal, and controlling the duty cycle of the switch driving signal based on the comparison output signal; determining whether a value of the comparison output signal is a logic state "0"; if the value of the comparison output signal is not the logic state "0," determining whether a value of the pulse-width-modulated signal is the logic state "0" at a rising edge of a duty signal; if the value of the pulse-width-modulated signal is the logic state "0" at the rising edge of the duty signal, disabling the transient-response control signal, and controlling the duty cycle of the switch driving signal based on the pulse-width-modulated signal; if the value of the pulse-width-modulated signal is not the logic state "0" at the rising edge of the duty signal, enabling the transient-response control signal, and controlling the duty cycle of the switch driving signal based on the comparison output signal; if the value of the comparison output signal is the logic state "0," determining whether the value of the pulse-width-modulated signal is a logic state "1" at the rising edge of the duty signal; if the value of the pulse-width-modulated signal is the state logic "1" at the rising edge of the duty signal, disabling the transient-response control signal, and controlling the duty cycle of the switch driving signal based on the pulse-width-modulated signal; and when the value of the pulse-width-modulated signal is not the logic state "1" at the rising edge of the duty signal, enabling the transient-response control signal, and controlling the duty cycle of the switch driving signal based on the comparison output signal.

According to at least one example embodiment, a device includes a power converter configured to generate a D.C. output voltage based on a switch driving signal and a D.C. input voltage. The device includes a switch driver configured to perform frequency compensation on the D.C. output voltage to generate a feedback signal, and generate a first control signal and a second control signal. The first control signal is generated based on the feedback signal and a first reference signal, and the second control signal is generated based on the D.C. output voltage and a second reference signal. The switch driver is configured to select one of the first control signal and the second control signal based on an operation mode of the device, the operation mode being based on a load current flowing through a load connected to the device. The switch driver is configured to generate the switch driving signal based on the selected control signal.

According to at least one example embodiment, the switch driver is configured to select the first control signal if the operation mode indicates that the load current is constant.

According to at least one example embodiment, the switch driver is configured to select the second control signal if the operation mode indicates that the load current changes.

According to at least one example embodiment, the switch driver is configured to detect the operation mode based on a clock signal and a duty signal.

According to at least one example embodiment, the first reference signal is a ramp signal.

BRIEF DESCRIPTION OF THE DRAWINGS

The foregoing and other features and advantages of the inventive concepts will be apparent from the description of example embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings.

DETAILED DESCRIPTION OF EXAMPLE EMBODIMENTS

Figure 1:
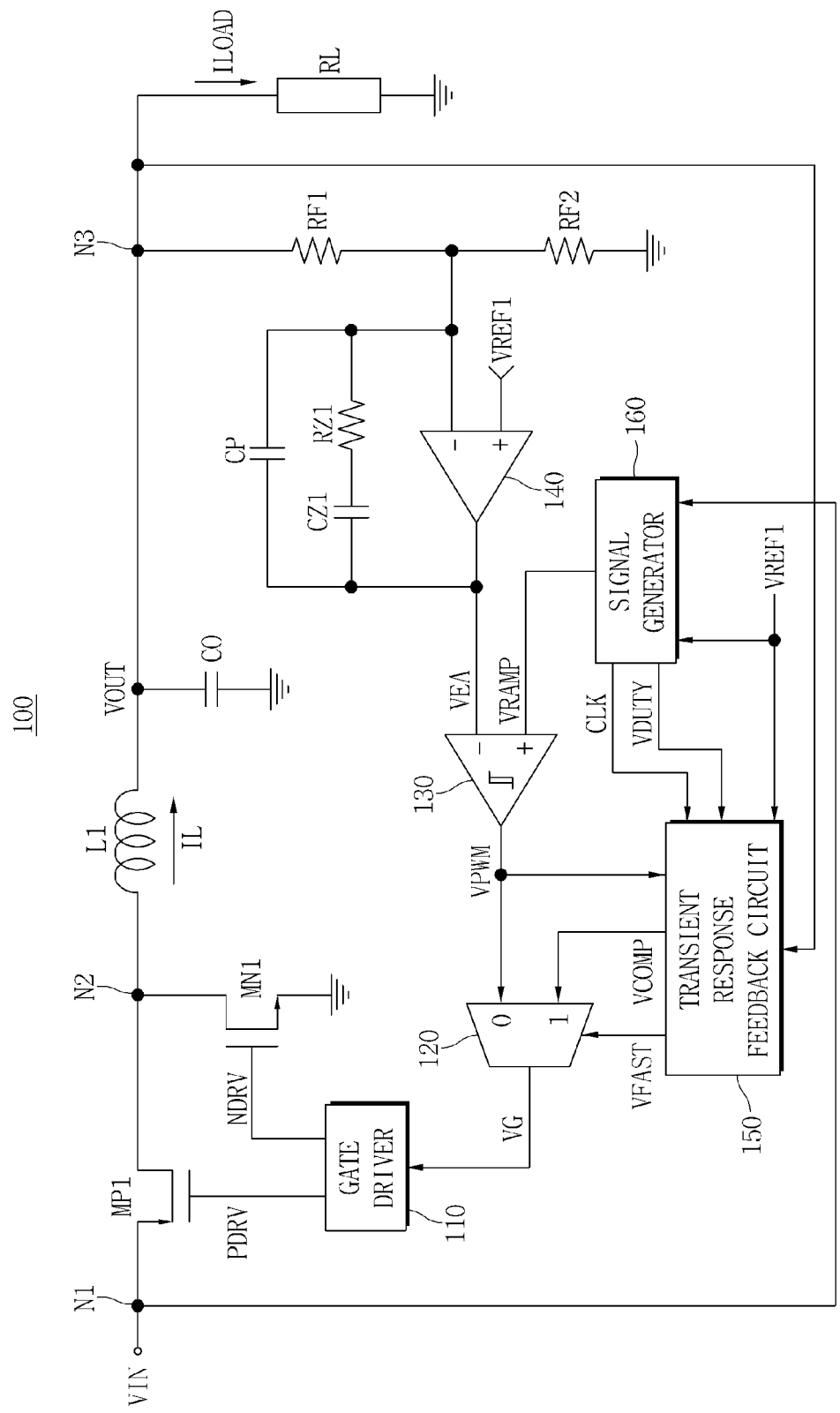
FIG. 1 is a circuit diagram illustrating a dual-mode buck converter in accordance with at least one example embodiment of inventive concepts.

Inventive concepts will now be described more fully with reference to the accompanying drawings, in which example embodiments of are shown. These example embodiments are provided so that this disclosure will be thorough and complete, and will fully convey inventive concepts of to those skilled in the art. Inventive concepts may be embodied in many different forms with a variety of modifications, and a few embodiments will be illustrated in drawings and explained in detail. However, this should not be construed as being limited to example embodiments set forth herein, and rather, it should be understood that changes may be made in these example embodiments without departing from the principles and spirit of inventive concepts, the scope of which are defined in the claims and their equivalents. Like numbers refer to like elements throughout. In the drawings, the thicknesses of layers and regions are exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., electronic imaging systems, image processing systems, digital point-and-shoot cameras, personal digital assistants (PDAs), smartphones, tablet personal computers (PCs), laptop computers, etc.). Such existing hardware may include one or more Central Processing Units (CPUs), digital signal processors (DSPs), application-specific-integrated-circuits (ASICs), field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible or non-transitory machine readable mediums for storing information. The term "computer-readable medium" may include, but is not limited to, portable or fixed storage devices, optical storage devices, and various other tangible or non-transitory mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "includes", "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "and/or" includes any and all combinations of one or more of the associated listed items. Expressions such as "at least one of," when preceding a list of elements, modify the entire list of elements and do not modify the individual elements of the list.

The inventive concepts will now be described more fully with reference to the accompanying drawings, in which example embodiments of the inventive concepts are shown.

FIG. 1 is a circuit diagram illustrating a dual-mode buck converter in accordance with at least one example embodiment of inventive concepts.

Referring to FIG. 1, the buck converter 100 may include a switch driver and a power conversion unit.

The power conversion unit (or power converter) generates a direct current (D.C.) output voltage VOUT based on switch driving signals PDRV and NDRV and a D.C. input voltage VIN. The switch driver performs a frequency compensation on the D.C. output voltage VOUT to generate a first feedback voltage VEA and compares the first feedback voltage VEA with a ramp signal VRAMP to generate a pulse-width-modulated signal VPWM. The switch driver compares the D.C. output voltage VOUT with a first reference voltage VREF1 to generate a comparison output signal VCOMP and to generate the switch driving signals PDRV and NDRV based on the pulse-width-modulated signal VPWM in a normal operation mode. The switch driver generates the switch driving signals PDRV and NDRV based on the comparison output signal VCOMP in an abnormal operation mode.

The normal operation mode and the abnormal operation mode may be based on a load current flowing through a load connected to the switching D.C.-to-D.C. converter. For example, the abnormal operation mode may be a mode in which a transient change in the D.C. output voltage VOUT occurs due to a change in a load current ILOAD. The normal operation mode may be a mode in which the D.C. output voltage VOUT is constant due to the load current ILOAD being constant.

The power conversion unit may include a PMOS transistor MP1, an NMOS transistor MN1, an inductor L1, and a capacitor CO.

The PMOS transistor MP1 is connected between a first node N1 to which the D.C. input voltage VIN is applied and a second node N2. The PMOS transistor MP1 is configured to operate in response to the first switch driving signal PDRV. The NMOS transistor MN1 is connected between the second node N2 and a ground voltage. The NMOS transistor MN1 is configured to operate in response to the second switch driving signal NDRV. The inductor L1 is connected between the second node N2 and an output node N3, and the capacitor CO is connected between the output node N3 and the ground voltage.

The switch driver may include a voltage divider, a frequency compensation circuit, a first comparator 130, a transient-response feedback circuit 150, a signal generator 160, a selecting circuit 120, and a gate driver 110.

The voltage divider includes feedback resistors RF1 and RF2, and divides the D.C. output voltage VOUT to generate a first voltage signal. The signal generator 160 generates a duty signal VDUTY based on the D.C. input voltage VIN and the first reference voltage VREF1. The duty signal VDUTY may have a duty ratio (or duty cycle) that changes according to the ramp signal VRAMP, a clock signal CLK, and the D.C. input voltage VIN. The frequency compensation circuit performs frequency compensation on a first voltage signal to generate the first feedback voltage VEA. The first comparator 130 compares the first feedback voltage VEA with the ramp signal VRAMP to generate the pulse-width-modulated signal VPWM. The transient-response feedback circuit 150 compares the D.C. output voltage VOUT with the first reference voltage VREF1 to generate the comparison output signal VCOMP. The transient-response feedback circuit 150 generates the transient-response control signal VFAST based on the clock signal CLK, the duty signal VDUTY, the pulse-width-modulated signal VPWM, and the comparison output signal VCOMP. The selecting circuit 120 selects one of the pulse-width-modulated signal VPWM and the comparison output signal VCOMP in response to the transient-response control signal VFAST, and outputs the selected signal as a gate control signal VG. The gate driver 110 generates the switch driving signals PDRV and NDRV based on the gate control signal VG.

The frequency compensation circuit may include an error amplifier 140, a first capacitor CZ1, a first resistor RZ1, and a second capacitor CP.

The error amplifier 140 has a first input terminal to which the first voltage signal is applied and a second input terminal (e.g., a non-inverting input terminal) to which the first reference voltage VREF1 is applied. The error amplifier 140 amplifies a difference between the first voltage signal and the first reference voltage VREF1 to generate the first feedback voltage VEA. The first capacitor CZ1 and the first resistor RZ1 are serially connected to each other between a first input terminal (e.g., an inverting input terminal) of the error amplifier 140 and an output terminal of the error amplifier 140. The second capacitor CP is connected between the first input terminal of the error amplifier 140 and the output terminal of the error amplifier 140. A load RL may be connected between the output node N3 of the buck converter 100 and the ground voltage.

The buck converter 100 of FIG. 1 may operate as follows.

First, when the first switch driving signal PDRV is activated and the second switch driving signal NDRV is deactivated, the PMOS transistor MP1 is turned on and the NMOS transistor MN1 is turned off. Therefore, an inductor current IL flows through the PMOS transistor MP1 and the inductor L1. In this condition, the inductor L1 converts electric energy into magnetic energy corresponding to the current and stores the magnetic energy. Therefore, the longer the active period of the first switch driving signal PDRV, the more magnetic energy is stored in the inductor L1.

Next, when the first switch driving signal PDRV is deactivated and the second switch driving signal NDRV is activated, the PMOS transistor MP1 is turned off and the NMOS transistor MN1 is turned on. Therefore, the inductor current IL flows through the NMOS transistor MN1, the inductor L1, and a feedback circuit that includes the feedback resistors RF1 and RF2. Further, the inductor current IL charges the capacitor CO.

Figure 2:
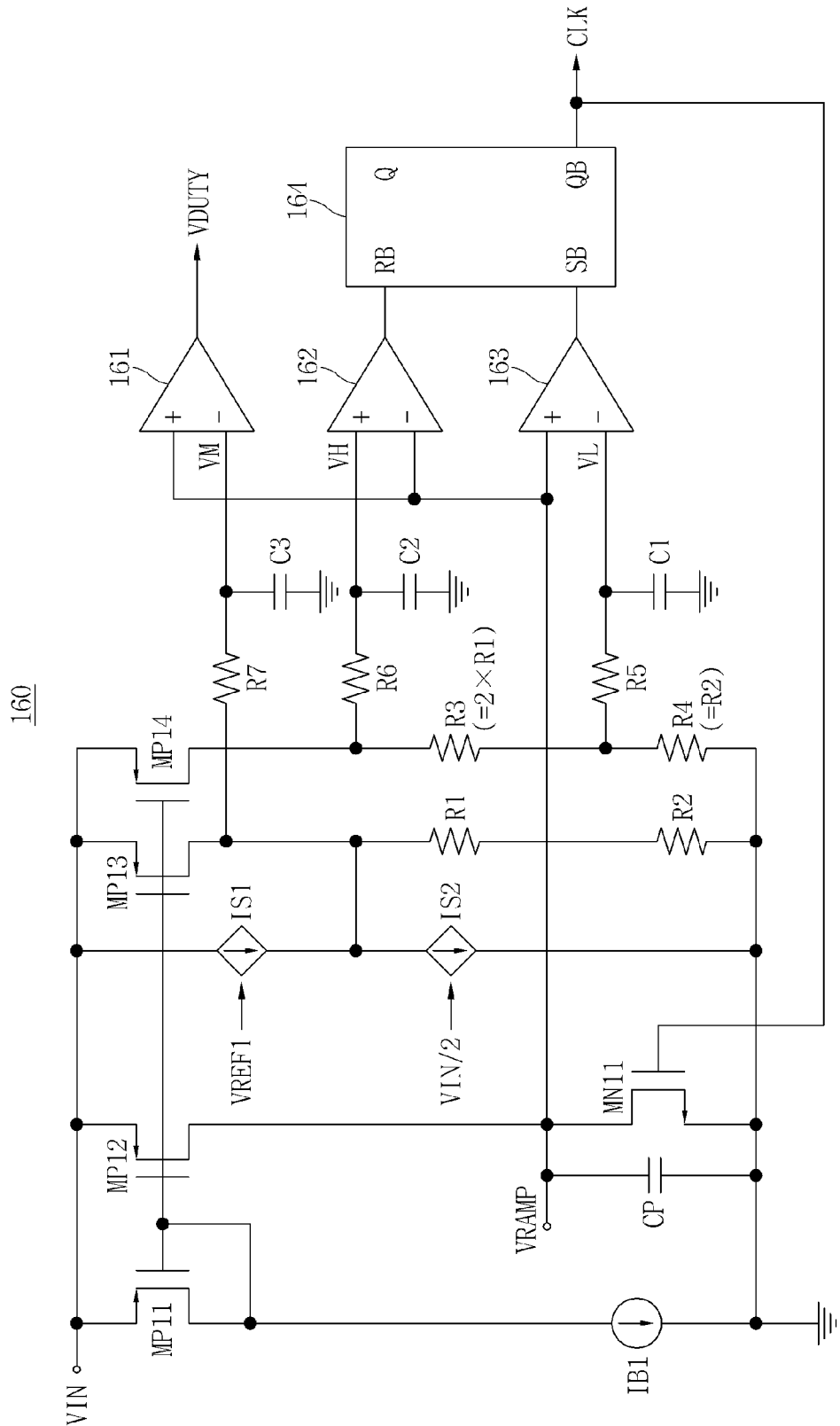
FIG. 2 is a circuit diagram illustrating an example of a signal generator included in the buck converter of FIG. 1.

FIG. 2 is a circuit diagram illustrating the signal generator 160 included in the buck converter 100 of FIG. 1.

Referring to FIG. 2, the signal generator 160 may include PMOS transistors MP11, MP12, MP13 and MP14, a current source IB1, dependent current sources IS1 and IS2, capacitors CP, C1, C2, and C3, an NMOS transistor MN11, resistors R1 to R7, comparators 161, 162, and 163, and an R/S flip-flop 164.

The PMOS transistors MP11, MP12, MP13, and MP14 are connected to each other in a current-mirror form, and source terminals of the PMOS transistors MP11, MP12, MP13, and MP14 are connected to the D.C. input voltage VIN. A source terminal and a drain terminal of the PMOS transistor MP11 are connected to each other, and the PMOS transistor MP11 is connected to a first terminal of the current source IB1. A second terminal of the current source IB1 is connected to a ground voltage. The capacitor CP is connected between a drain terminal of the PMOS transistor MP12 and the ground voltage, and outputs a ramp signal VRAMP. The NMOS transistor MN11 has a gate terminal to which an output signal of the R/S flip-flop 164, that is, the clock signal CLK, is applied. The NMOS transistor MN11 has a drain terminal connected to the drain terminal of the PMOS transistor MP12, and a source terminal connected to the ground voltage. The capacitor CP is charged by the PMOS transistor MP12 and discharged by the NMOS transistor MN11.

In FIG. 2, the resistors R1, R2, R3, and R4 determine a voltage level of a comparison input signal. The resistors R1 and R2 are serially connected to each other, and connected between a drain terminal of the PMOS transistor MP13 and the ground voltage. The resistors R3 and R4 are serially connected to each other, and connected between a drain terminal of the PMOS transistor MP14 and the ground voltage. The resistors R5, R6, and R7 and the capacitors C1, C2, and C3 reduce a noise of the signal generator 160.

The resistor R4 is connected to an inverting input terminal of the comparator 163, and determines a lower limit VL of the ramp signal VRAMP. The resistors R3 and R4 are connected to a non-inverting input terminal of the comparator 162, and determine an upper limit VH of the ramp signal VRAMP. The ramp signal VRAMP is applied to a non-inverting input terminal of the comparator 163 and an inverting input terminal of the comparator 162. The comparator 163 compares the ramp signal VRAMP with the lower limit VL to generate a first comparison output, and the comparator 162 compares the ramp signal VRAMP with the upper limit VH to generate a second comparison output. The R/S flip-flop 164 generates the clock signal CLK based on the first comparison output and the second comparison output.

In FIG. 2, the dependent current sources IS1 and IS2, the resistors R1 and R2, and the comparator 161 are used to generate the duty signal VDUTY. The dependent current sources IS1 and IS2 are serially connected to each other, and connected between the D.C. input voltage VIN and the ground voltage. A connecting point of the dependent current sources IS1 and IS2 may be connected to the drain terminal of the PMOS transistor MP13. The dependent current source IS1 may generate a current that varies in response to the reference voltage VREF1, and the dependent current source IS2 may generate a current that varies in response to the D.C. input voltage VIN. For example, the dependent current source IS2 may generate a current that varies in response to one half VIN/2 of the D.C. input voltage VIN. The comparator 161 compares the ramp signal VRAMP with the first voltage signal VM to generate the duty signal VDUTY. The magnitude of the first voltage signal VM may be determined by the resistors R1 and R2 and values of currents flowing through the dependent current sources IS1 and IS2. The magnitude of the first voltage signal VM may have a voltage level between the magnitudes of the lower limit VL and the upper limit VH. Therefore, the resistor R4 may have the same resistance as the resistor R2 and the resistor R3, but may have a resistance larger than the resistor R1. For example, the resistor R3 may have a resistance two times the resistor R1. Further, the magnitude of the first voltage signal VM, used as the comparison input signal, may vary according to a magnitude of a current flowing through the dependent current sources IS1 and IS2. For example, when the D.C. input voltage VIN increases and the magnitude of a current flowing through the dependent current source IS2 increases, the magnitude of the first voltage signal VM may decrease. Further, when the magnitude of the reference voltage VREF1 increases and the magnitude of a current flowing through the dependent current source IS1 increases, the magnitude of the first voltage signal VM may increase.

Therefore, the duty ratio of the duty signal VDUTY may be changed in response to the D.C. input voltage VIN and the reference voltage VREF1. Therefore, the duty signal VDUTY may have information about the target duty ratio of the buck converter 100 of FIG. 1.

Figure 3:
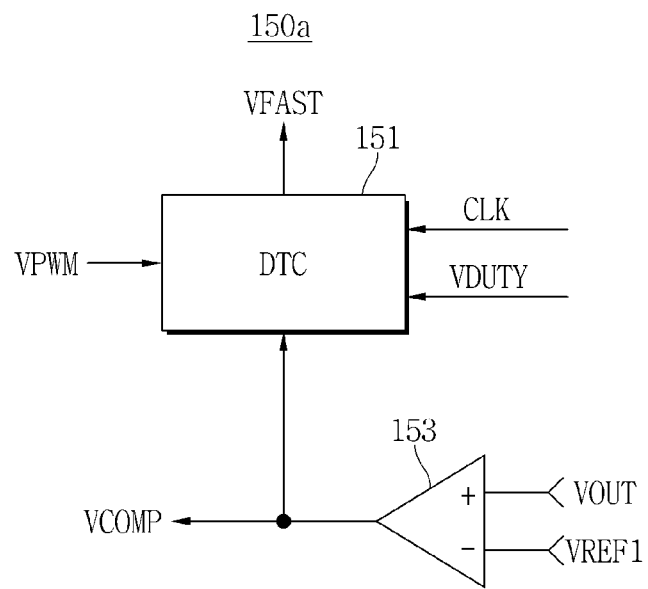
FIG. 3 is a circuit diagram illustrating an example of a transient-response feedback circuit included in the buck converter of FIG. 1.

FIG. 3 is a circuit diagram illustrating an example of a transient-response feedback circuit 150a included in the buck converter 100 of FIG. 1.

Referring to FIG. 3, the transient-response feedback circuit 150a may include a second comparator 153 and a duty-based transient-response control circuit (DTC) 151.

The second comparator 153 compares the D.C. output voltage VOUT with the first reference voltage VREF1 to generate the comparison output signal VCOMP. The DTC 151 generates the transient-response control signal VFAST based on the clock signal CLK, the duty signal VDUTY, the pulse-width-modulated signal VPWM, and the comparison output signal VCOMP.

According to at least one example embodiment, the transient-response feedback circuit 150*a* may detect the comparison output signal VCOMP using the clock signal CLK, and detect the pulse-width-modulated signal VPWM using the duty signal VDUTY.

According to at least one example embodiment, the transient-response feedback circuit 150*a* may enable the transient-response control signal VFAST when a pulse of the comparison output signal VCOMP is not generated for one period of the clock signal CLK. The comparison output signal VCOMP may be output as the gate control signal VG when the transient-response control signal VFAST is enabled, and the pulse-width-modulated signal VPWM may be output as the gate control signal VG when the transient-response control signal VFAST is disabled.

According to at least the above described example embodiment, the duty ratio of the duty signal VDUTY may be adjusted. Further, the duty ratio of the duty signal VDUTY may be determined based on the D.C. input voltage VIN and the first reference voltage VREF1.

Figure 4:
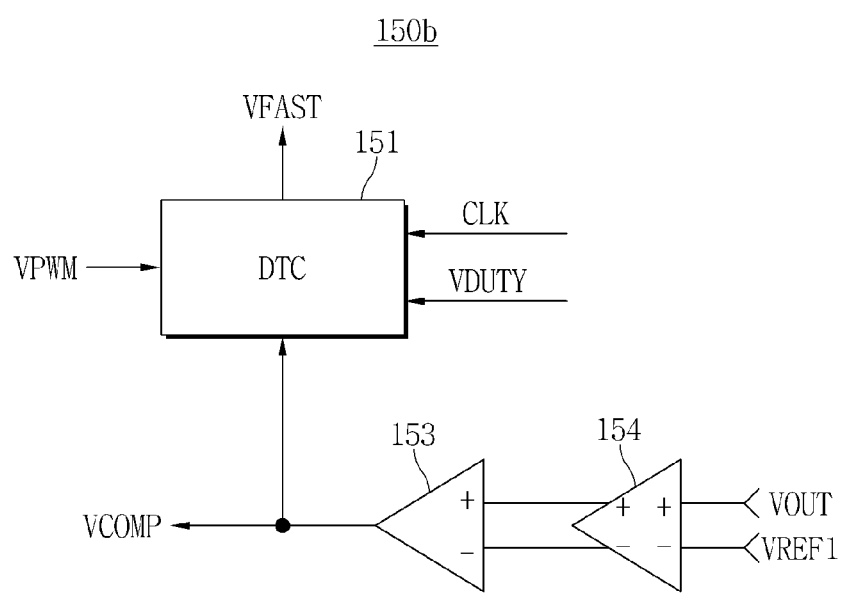
FIG. 4 is a circuit diagram illustrating another example of a transient-response feedback circuit included in the buck converter of FIG. 1.

FIG. 4 is a circuit diagram illustrating another example of a transient-response feedback circuit 150*b* included in the buck converter 100 of FIG. 1.

Referring to FIG. 4, the transient-response feedback circuit 150*b* may include a pre-amplifier 154, a second comparator 153 and a DTC 151.

The pre-amplifier 154 amplifies a difference between the D.C. output voltage VOUT and the first reference voltage VREF1 to generate a differential output signal pair. The second comparator 153 compares the differential output signal pair to each other to generate the comparison output signal VCOMP. The DTC 151 generates the transient-response control signal VFAST based on the clock signal CLK, the duty signal VDUTY, the pulse-width-modulated signal VPWM, and the comparison output signal VCOMP. The transient-response feedback circuit 150*b* of FIG. 4 may reduce a D.C. offset of the second comparator 153 by including the pre-amplifier 154.

Figure 5:
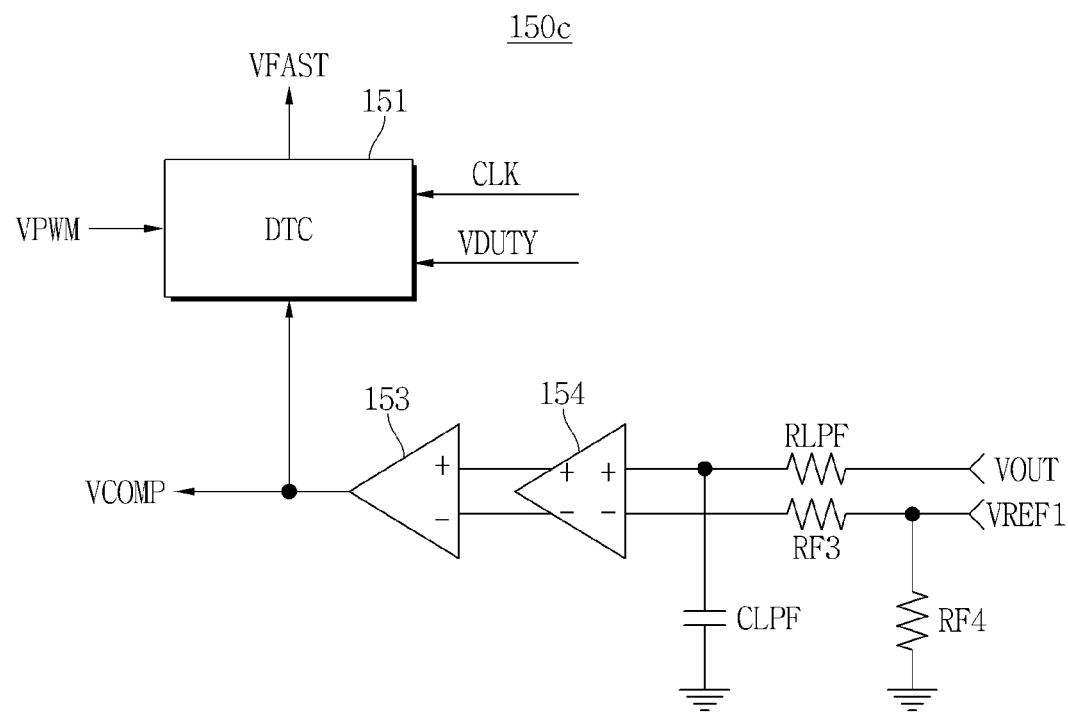
FIG. 5 is a circuit diagram illustrating still another example of a transient-response feedback circuit included in the buck converter of FIG. 1.

FIG. 5 is a circuit diagram illustrating still another example of a transient-response feedback circuit 150*c* included in the buck converter 100 of FIG. 1.

Referring to FIG. 5, the transient-response feedback circuit 150*c* may include a first resistor RLPF, a first capacitor CLPF, a second resistor RF3, a third resistor RF4, a pre-amplifier 154, a second comparator 153 and a DTC 151.

The first resistor RLPF has a first terminal to which the D.C. output voltage VOUT is applied, and a second terminal connected to a first input terminal of the pre-amplifier 154. The first capacitor CLPF is connected between the second terminal of the first resistor RLPF and a ground voltage. The second resistor RF3 has a first terminal to which the first reference voltage VREF1 is applied, and a second terminal connected to a second input terminal of the pre-amplifier 154. The third resistor RF4 is connected between the first reference voltage VREF1 and the ground voltage. The pre-amplifier 154 amplifies a difference between the D.C. output voltage VOUT and the first reference voltage VREF1 to generate a differential output signal pair. The second comparator 153 compares the differential output signal pair to each other to generate the comparison output signal VCOMP. The DTC 151 generates the transient-response control signal VFAST based on the clock signal CLK, the duty signal VDUTY, the pulse-width-modulated signal VPWM, and the comparison output signal VCOMP.

FIGS. 6 to 9 are timing diagrams illustrating an operation of the buck converter 100 of FIG. 1.

Figure 6:
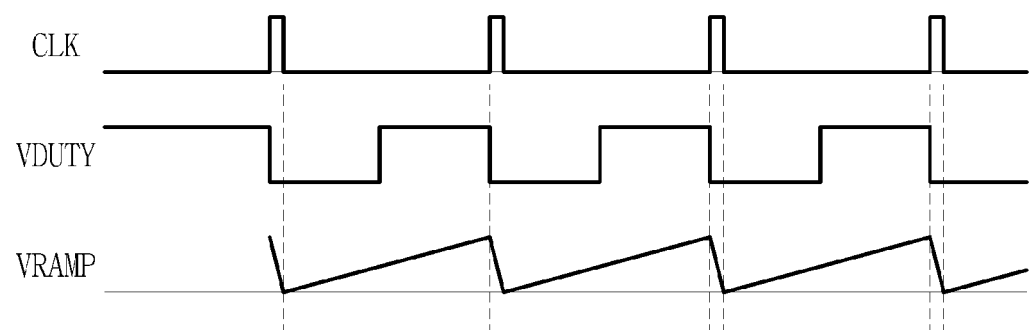
FIGS. 6 to 9 are timing diagrams illustrating an operation of the buck converter of FIG. 1.

Referring to FIG. 6, the clock signal CLK and the duty signal VDUTY may have a certain period, respectively. For example, the duty signal VDUTY may have a larger duty ratio than the clock signal CLK. The ramp signal VRAMP oscillates in synchronization with the clock signal CLK, and may have a triangular waveform.

Figure 7:
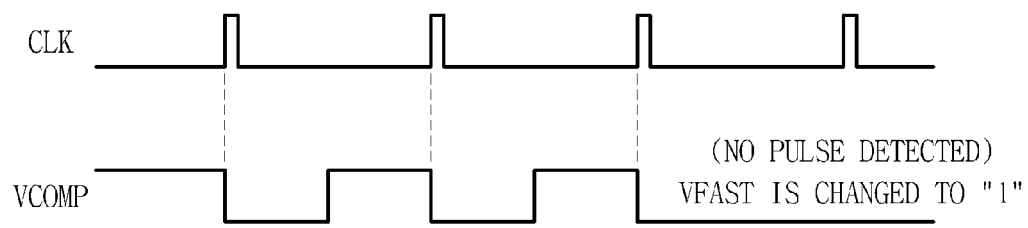

Referring to FIG. 7, the transient-response feedback circuit 150 may detect the comparison output signal VCOMP using the clock signal CLK, and enable the transient-response control signal VFAST when a pulse of the comparison output signal VCOMP is not generated for one period of the clock signal CLK. For example, when the pulse of the comparison output signal VCOMP is not generated for one period of the clock signal CLK, the transient-response feedback circuit 150 may change the value of the transient-response control signal VFAST to a logic "1". When the pulse of the comparison output signal VCOMP is not generated for one period of the clock signal CLK, it may be determined that the voltage level of a voltage of the output node N3, that is, the D.C. output voltage is changed transiently.

The comparison output signal VCOMP may be output as the gate control signal VG when the transient-response control signal VFAST is enabled, and the pulse-width-modulated signal VPWM may be output as the gate control signal VG when the transient-response control signal VFAST is disabled. When the transient-response control signal VFAST is enabled, the switching D.C.-to-D.C. converter 100 may have a fast transient-response characteristic.

Figure 8:
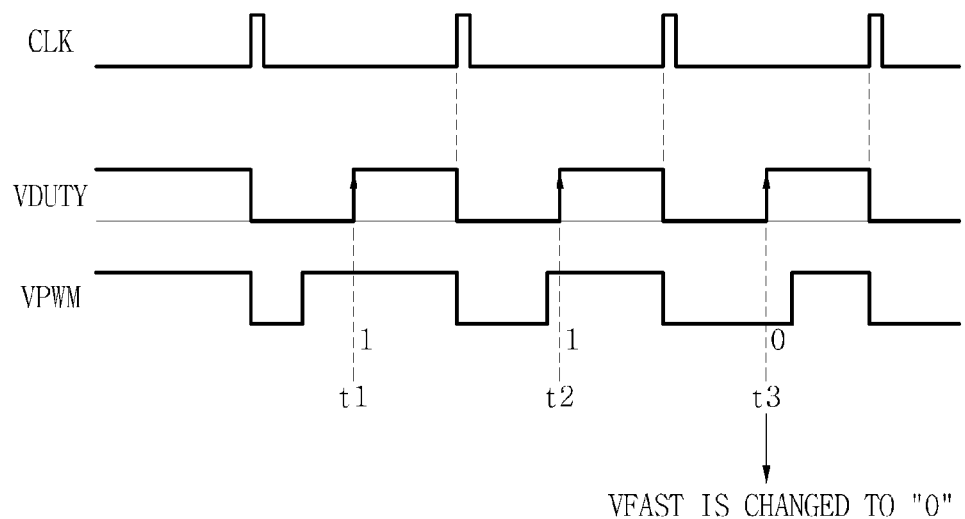

Referring to FIG. 8, the transient-response feedback circuit 150 may detect the pulse-width-modulated signal VPWM using the duty signal VDUTY.

When the buck converter 100 operates in a fast transient-response operating mode and then samples the pulse-width-modulated signal VPWM at a rising edge of the duty signal VDUTY, and when the sampling result shows that a logic state of the pulse-width-modulated signal VPWM changes from a first state to a second state, the transient-response feedback circuit 150 may disable the transient-response control signal VFAST. When the transient-response control signal VFAST is disabled, the buck converter 100 may operate in a normal operating mode.

Figure 9:
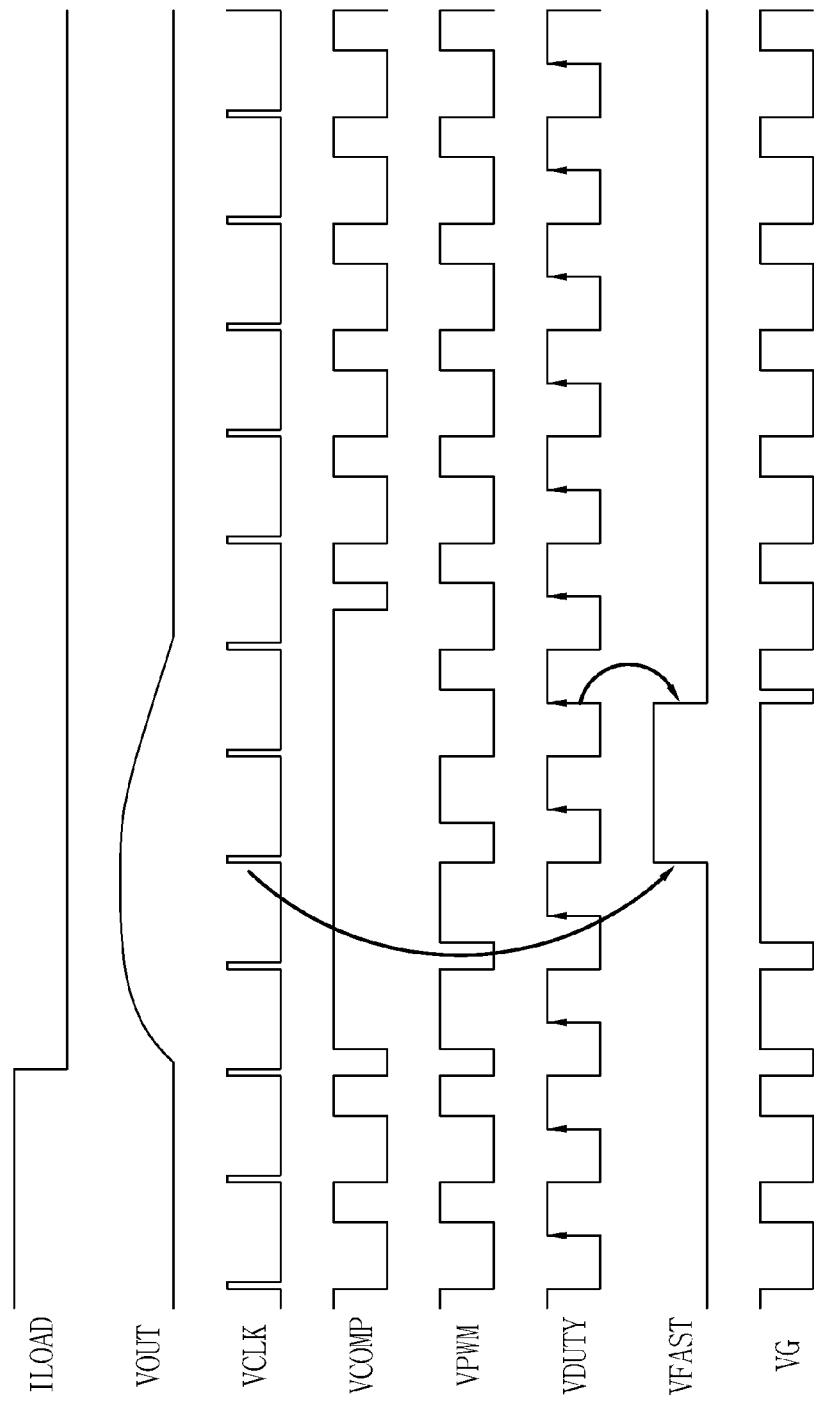

Referring to FIG. 9, when the D.C. output voltage VOUT increases and an abnormal operation is detected, and the comparison output signal VCOMP maintains in a logic "1" state, the transient-response control signal VFAST is enabled and the buck converter 100 may operate in a transient-response operating mode. After that, when the pulse-width-modulated signal VPWM is sampled at the rising edge of the duty signal VDUTY and the logic state of the pulse-width-modulated signal VPWM is changed from the first state to the second state, the transient-response feedback circuit 150 may disable the transient-response control signal VFAST. In the example of FIG. 9, when the logic state of the pulse-width-modulated signal VPWM is changed from the logic "1" to a logic "0", the transient-response control signal VFAST is disabled. Therefore, the buck converter 100 may operate in the normal operating mode.

Figure 10:
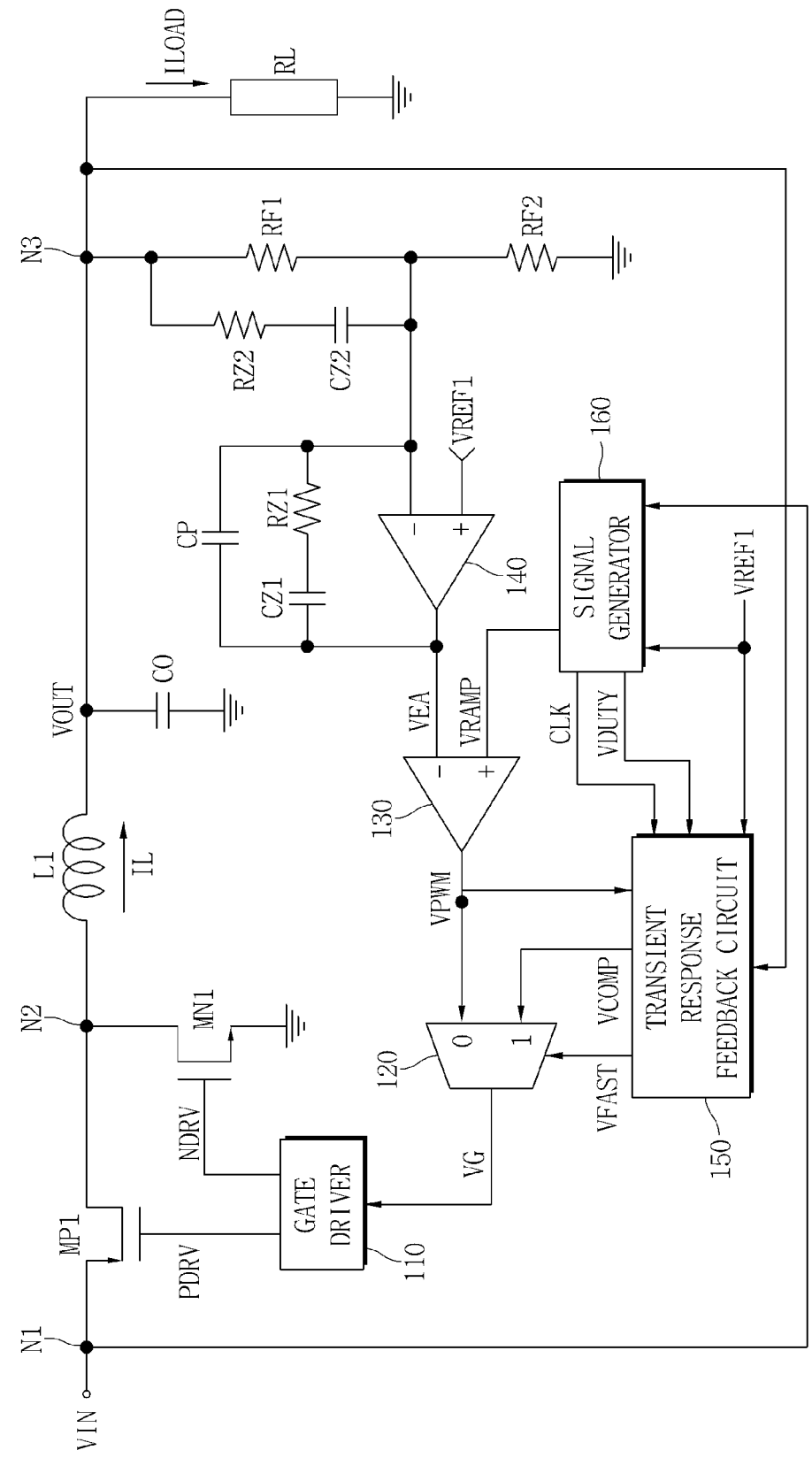
FIG. 10 is a circuit diagram illustrating a dual-mode buck converter in accordance with at least one example embodiment of inventive concepts.

FIG. 10 is a circuit diagram illustrating a dual-mode buck converter 200 in accordance with at least one example embodiment of inventive concepts.

Compared with the dual-mode buck converter 100 of FIG. 1, the dual-mode buck converter 200 may further include a resistor RZ2 and a capacitor CZ2 which are connected in series and to the resistor RF1 in parallel. The dual-mode buck converter 200 having the structure of FIG. 8 may decrease a noise of the D.C. output voltage VOUT.

Figure 11:
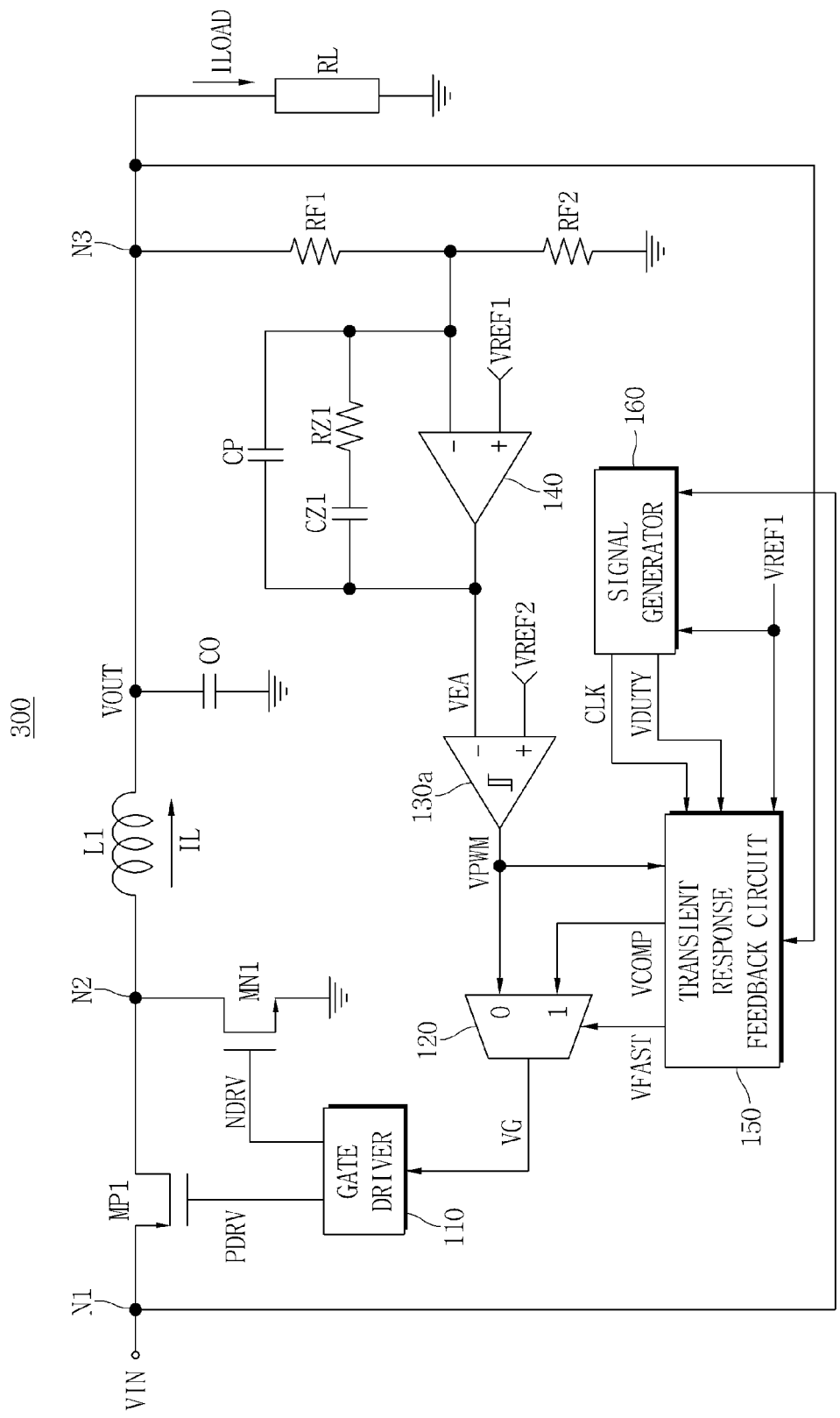
FIG. 11 is a circuit diagram illustrating a dual-mode buck converter in accordance with at least one example embodiment of inventive concepts.

FIG. 11 is a circuit diagram illustrating a dual-mode buck converter 300 in accordance with at least one example embodiment of inventive concepts.

The first comparator 130 in the dual-mode buck converter 100 of FIG. 1 compares the first feedback voltage VEA with the ramp signal VRAMP to generate the pulse-width-modulated signal VPWM, but a first comparator 130a in the dual-mode buck converter 300 of FIG. 11 compares the first feedback voltage VEA with a second reference voltage VREF2 to generate the pulse-width-modulated signal VPWM. The remaining circuit configuration except the first comparator 130a is the same as the circuit configuration of FIG. 1.

Figure 12:
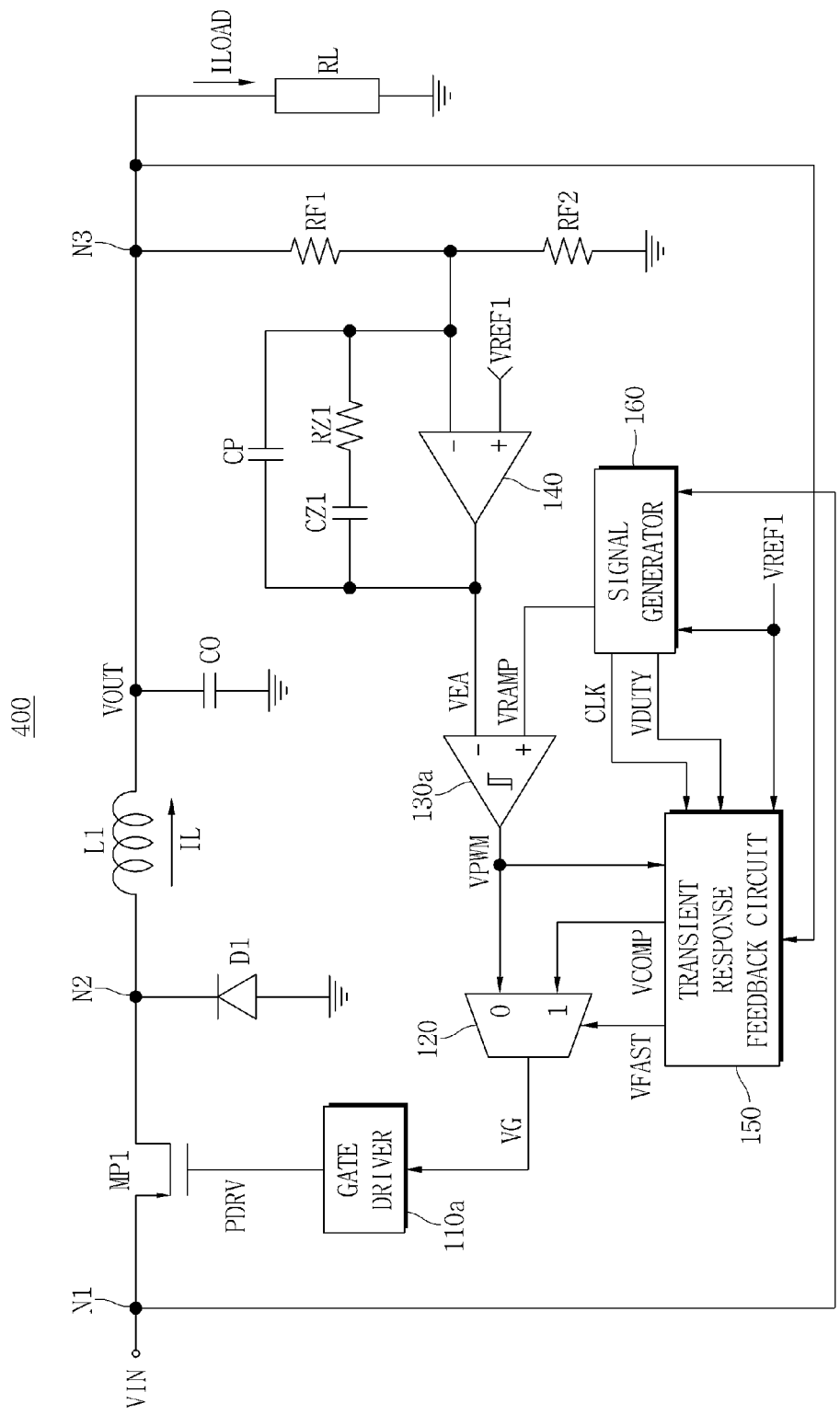
FIG. 12 is a circuit diagram illustrating a dual-mode buck converter in accordance with at least one example embodiment of inventive concepts.

FIG. 12 is a circuit diagram illustrating a dual-mode buck converter 400 in accordance with at least one example embodiment of inventive concepts. In the dual-mode buck converter 400 of FIG. 12, the configuration of a power conversion unit is different from the circuit of FIG. 1 in that FIG. 12 includes a diode D1. For example, the power conversion unit of FIG. 12 may include PMOS transistor MP1, a diode D1, an inductor L1 and a capacitor CO.

The PMOS transistor MP1 is connected between a first node N1 to which the D.C. input voltage VIN is applied and a second node N2, and operates in response to a first switch driving signal PDRV. The diode D1 is connected between the second node N2 and a ground voltage. The inductor L1 is connected between the second node N2 and the output node N3, and the capacitor CO is connected between the output node N3 and the ground voltage.

Figure 13:
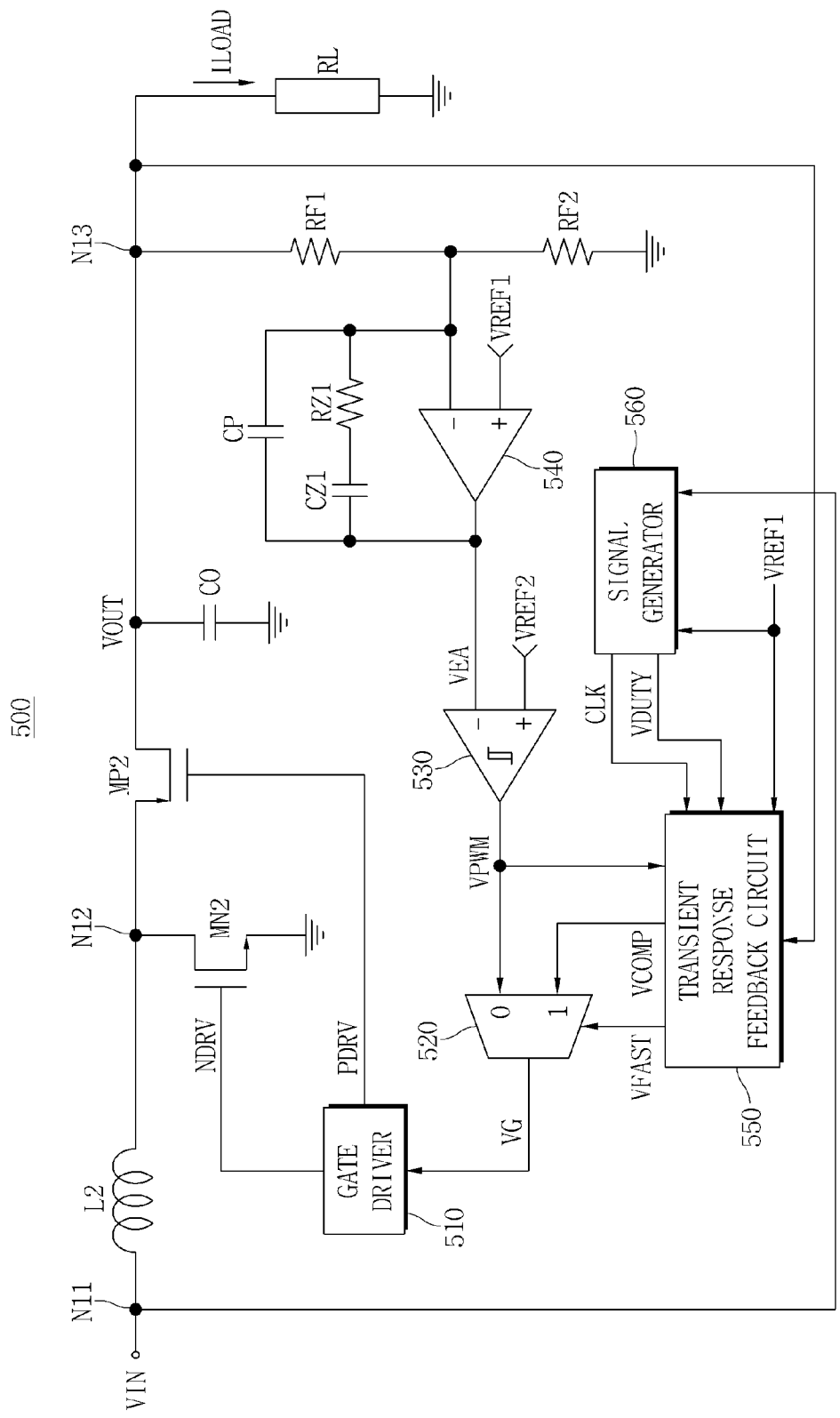
FIG. 13 is a circuit diagram illustrating a dual-mode boost converter in accordance with at least one example embodiment of inventive concepts.

FIG. 13 is a circuit diagram illustrating a dual-mode boost converter 500 in accordance with at least one example embodiment of inventive concepts.

Referring to FIG. 13, the dual-mode boost converter 500 may include a switch driver and a power conversion unit.

The power conversion unit generates a D.C. output voltage VOUT based on switch driving signals PDRV and NDRV and a D.C. input voltage VIN. The switch driver performs a frequency compensation on the D.C. output voltage VOUT to generate a first feedback voltage VEA, compares the first feedback voltage VEA with a reference voltage VREF2 to generate a pulse-width-modulated signal VPWM. The switch driver compares the D.C. output voltage VOUT with a reference voltage VREF1 to generate a comparison output signal VCOMP, and generates the switch driving signals PDRV and NDRV based on the pulse-width-modulated signal VPWM in a normal operation mode. The switch driver generates the switch driving signals PDRV and NDRV based on the comparison output signal VCOMP in an abnormal operation mode.

The abnormal operation may be a mode in which a transient change in the D.C. output voltage VOUT occurs due to a change in a load current ILOAD.

The power conversion unit may include an inductor L2 connected between a first node N1 to which the D.C. input voltage VIN is applied and a second node N12, and a PMOS transistor MP2 connected between the second node N12 and an output node N13 which operates in response to the first switch driving signal PDRV. The power conversion unit may include an NMOS transistor MN2 connected between the second node N12 and a ground voltage which operates in response to the second switch driving signal NDRV, and a capacitor CO connected between the output node N13 and the ground voltage.

The switch driver may include a voltage divider, a frequency compensation circuit, a first comparator 530, a transient-response feedback circuit 550, a signal generator 560, a selecting circuit 520, and a gate driver 510.

The voltage divider includes feedback resistors RF1 and RF2, and divides the D.C. output voltage VOUT to generate a first voltage signal. The signal generator 560 generates a duty signal VDUTY having a duty ratio that changes according to a clock signal CLK and the D.C. input voltage VIN, based on the D.C. input voltage VIN and the first reference voltage VREF1. The frequency compensation circuit performs frequency compensation on the first voltage signal to generate the first feedback voltage VEA. The first comparator 530 compares the first feedback voltage VEA with the reference voltage VREF1 to generate the pulse-width-modulated signal VPWM. The transient-response feedback circuit 550 compares the D.C. output voltage VOUT with the reference voltage VREF1 to generate the comparison output signal VCOMP, and generates a transient-response control signal VFAST based on the clock signal CLK, the duty signal VDUTY, the pulse-width-modulated signal VPWM, and the comparison output signal VCOMP. The selecting circuit 520 selects one of the pulse-width-modulated signal VPWM and the comparison output signal VCOMP in response to the transient-response control signal VFAST, and outputs the selected signal as a gate control signal VG. The gate driver 510 generates the switch driving signals PDRV and NDRV based on the gate control signal VG.

The frequency compensation circuit may include an error amplifier 540, a first capacitor CZ1, a first resistor RZ1, and a second capacitor CP.

The error amplifier 540 has a first input terminal to which the first voltage signal is applied and a second input terminal to which the reference voltage VREF1 is applied. The error amplifier 540 amplifies a difference between the first voltage signal and the reference voltage VREF1 to generate the first feedback voltage VEA. The first capacitor CZ1 and the first resistor RZ1 are serially connected to each other between the first input terminal of the error amplifier 540 and an output terminal of the error amplifier 540. The second capacitor CP is connected between the first input terminal of the error amplifier 540 and the output terminal of the error amplifier 540. A load RL may be connected between the output node N13 of the boost converter 500 and the ground voltage.

The boost converter 500 of FIG. 13 may operate as follows.

First, when the second switch driving signal NDRV is activated and the first switch driving signal PDRV is deactivated, the NMOS transistor MN2 is turned on and the PMOS transistor MP2 is turned off. Therefore, the current of the inductor L2 flows through the inductor L2 and the NMOS transistor MN2. In this condition, the inductor L2 converts electric energy into the form of magnetic energy corresponding to the current and stores the magnetic energy. Therefore, the longer the active period of the second switch driving signal NDRV, the more magnetic energy is stored in the inductor L2.

Next, when the second switch driving signal NDRV is deactivated and the first switch driving signal PDRV is activated, the NMOS transistor MN2 is turned off and the PMOS transistor MP2 is turned on. Therefore, the current of the inductor L2 flows through the PMOS transistor MP2 and a feedback circuit that includes feedback resistors RF1 and RF2. Further, the current of the inductor L2 charges the capacitor CO. Here, the magnetic energy stored in the inductor L2 decreases at the same or similar rate as when the magnetic energy increased when the NMOS transistor was turned on and the PMOS transistor was turned off.

Using the converter 500 shown in FIG. 13, the duty ratio of the first switch driving signal PDRV and the second switch driving signal NDRV may be changed according to a magnitude of a feedback voltage divided from the D.C. output voltage VOUT.

Figure 14:
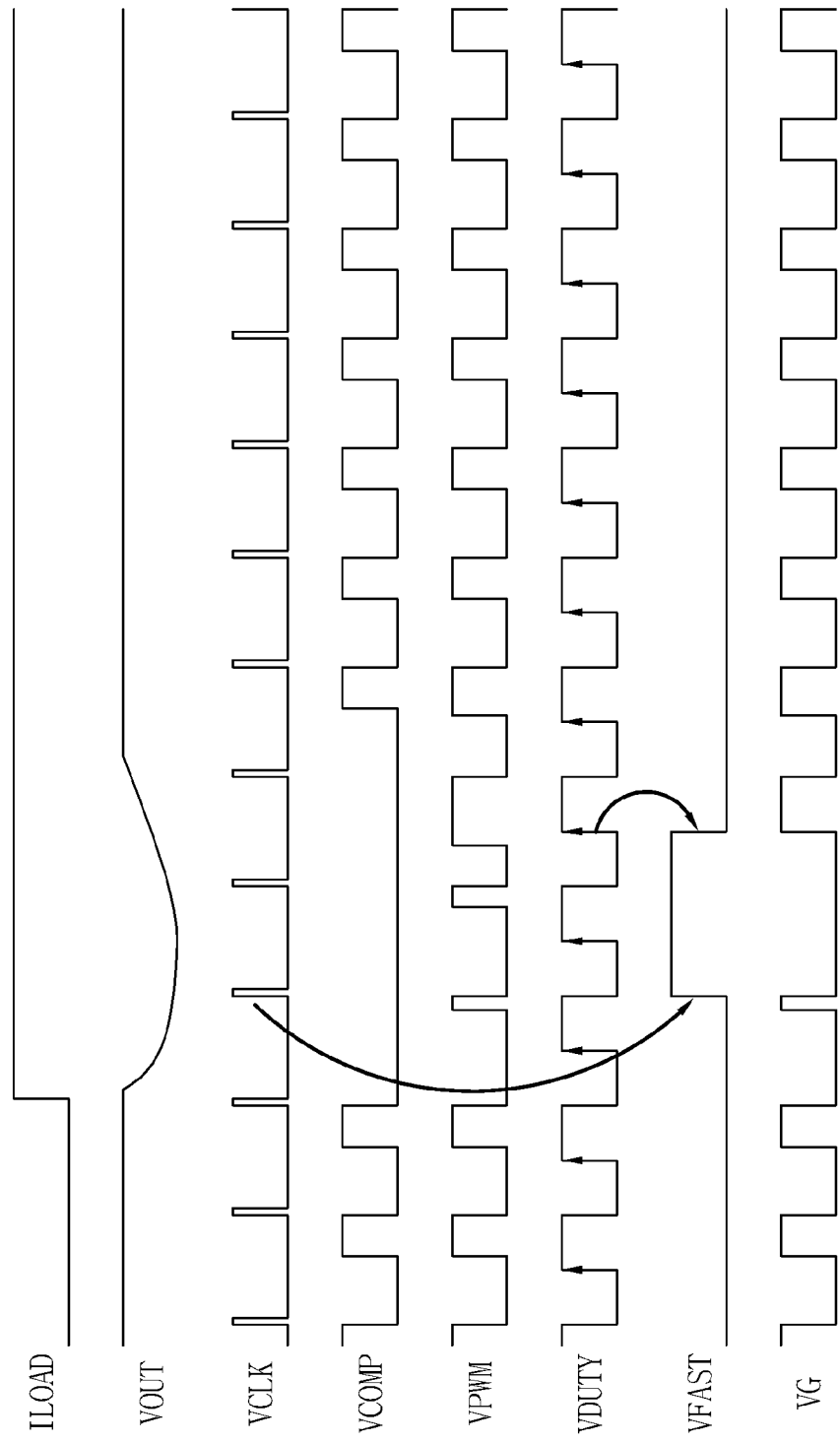
FIG. 14 is a timing diagram illustrating an operation of the boost converter of FIG. 13.

FIG. 14 is a timing diagram illustrating an operation of the boost converter of FIG. 13.

Referring to FIG. 14, when the D.C. output voltage VOUT decreases and an abnormal operation is detected, and the comparison output signal VCOMP maintains in a logic "0" state, the transient-response control signal VFAST is enabled and the boost converter 500 may operate in a transient-response operating mode. After that, when the pulse-width-modulated signal VPWM is sampled at a rising edge of the duty signal VDUTY and the logic state of the pulse-width-modulated signal VPWM is changed from a first state to a second state, the transient-response feedback circuit 550 may disable the transient-response control signal VFAST. In the example of FIG. 14, when the logic state of the pulse-width-modulated signal VPWM is changed from the logic "0" to the logic "1", the transient-response control signal VFAST is disabled. Therefore, the boost converter 500 may operate in the normal operating mode.

Figure 15:
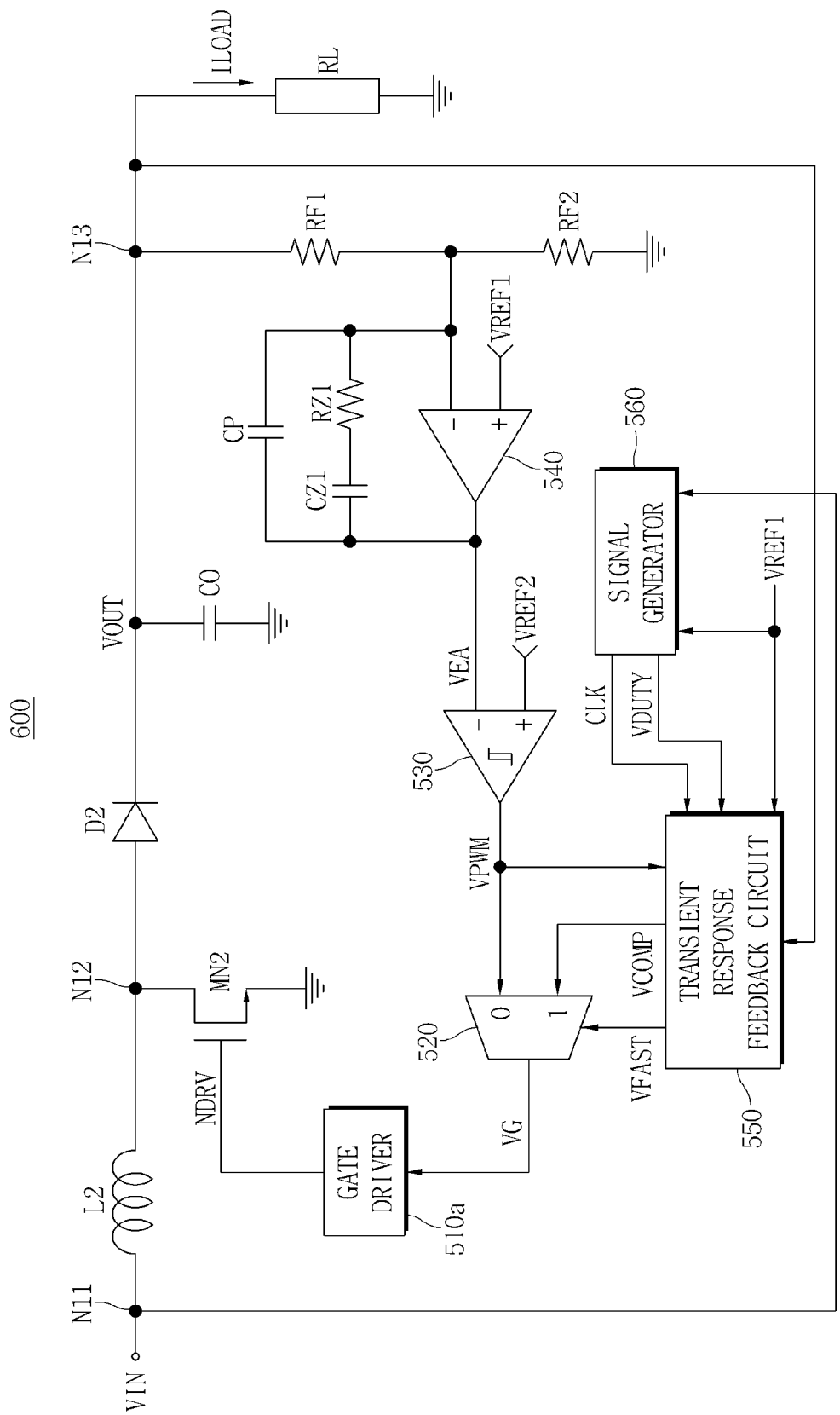
FIG. 15 is a circuit diagram illustrating a dual-mode boost converter in accordance with at least one example embodiment of inventive concepts.

FIG. 15 is a circuit diagram illustrating a dual-mode boost converter 600 in accordance with at least one example embodiment of inventive concepts. In the dual-mode boost converter 600 of FIG. 15, the configuration of a power conversion unit is different from the circuit of FIG. 13 in that FIG. 15 includes a diode D2. For example, the power conversion unit of FIG. 15 may include an inductor L2, an NMOS transistor MN2, a diode D2 and a capacitor CO.

The NMOS transistor MN2 is connected between the second node N12 and a ground voltage, and operates in response to the second switch driving signal NDRV. The diode D2 is connected between the second node N12 and the output node N13. The inductor L2 is connected between the first node N11 to which the D.C. input voltage VIN is applied and the second node N12, and the capacitor CO is connected between the output node N13 and the ground voltage.

Figure 16:
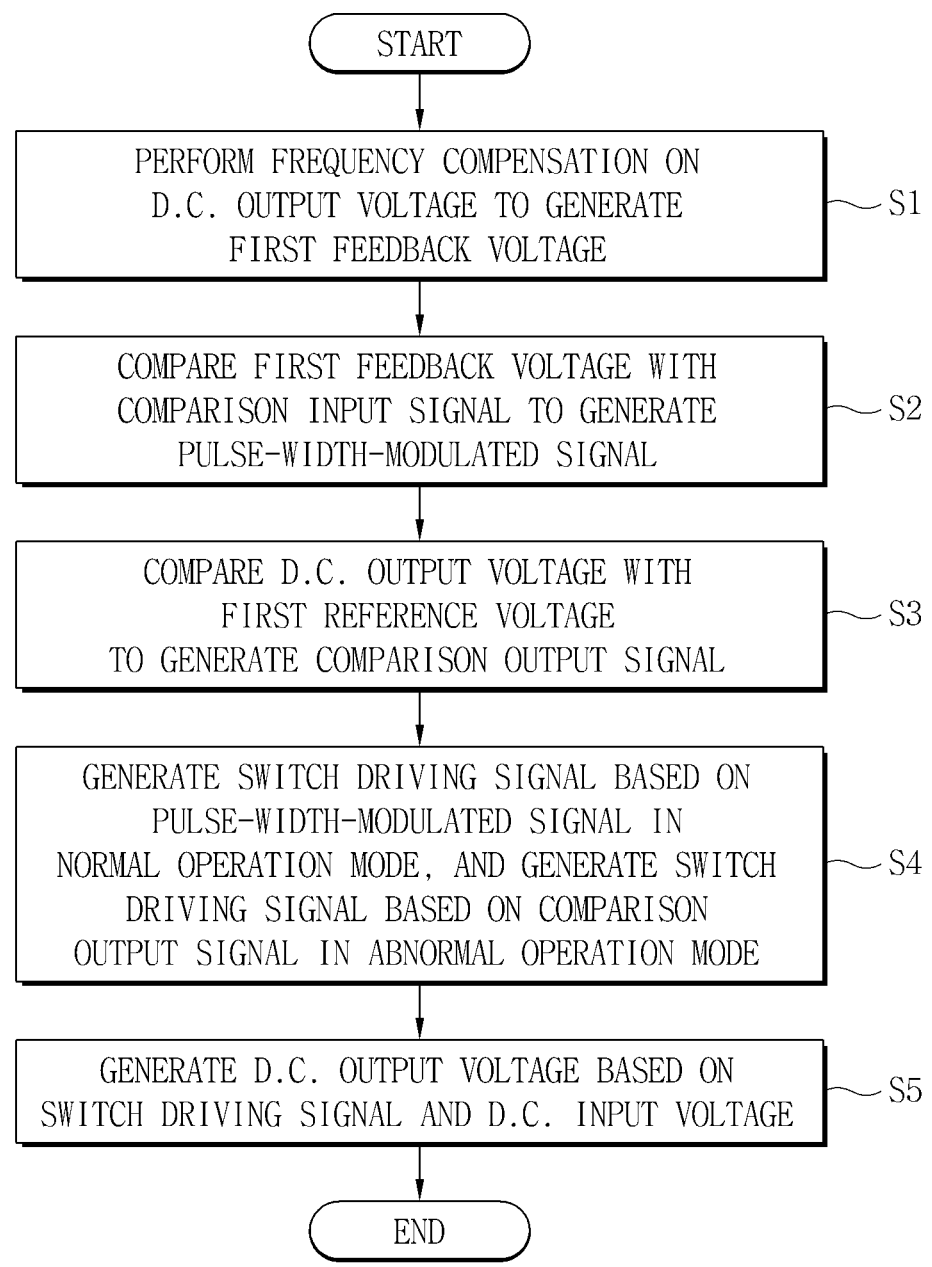
FIG. 16 is a flowchart illustrating a method of controlling a dual-mode switching D.C.-to-D.C. converter in accordance with at least one example embodiment of inventive concepts.

FIG. 16 is a flowchart illustrating a method of controlling a dual-mode switching D.C.-to-D.C. converter in accordance with at least one example embodiment of inventive concepts.

Referring to FIG. 16, the method of controlling the switching D.C.-to-D.C. converter in accordance with at least one example embodiment of inventive concepts may include the following operations.

In operation S1, the D.C.-to-D.C. converter (e.g., the converter 100 of FIG. 1) may perform a frequency compensation on a D.C. output voltage to generate a first feedback voltage.

In operation S2, the converter 100 may compare the first feedback voltage with a comparison input signal to generate a pulse-width-modulated signal.

In operation S3, the converter 100 may compare the D.C. output voltage with a first reference voltage to generate a comparison output signal.

In operation S4 the converter 100 may generate a switch driving signal based on the pulse-width-modulated signal in a normal operation mode, and generate the switch driving signal based on the comparison output signal in an abnormal operation mode.

In operation S5, the converter 100 may generate the D.C. output voltage based on the switch driving signal and a D.C. input voltage.

Figure 17:
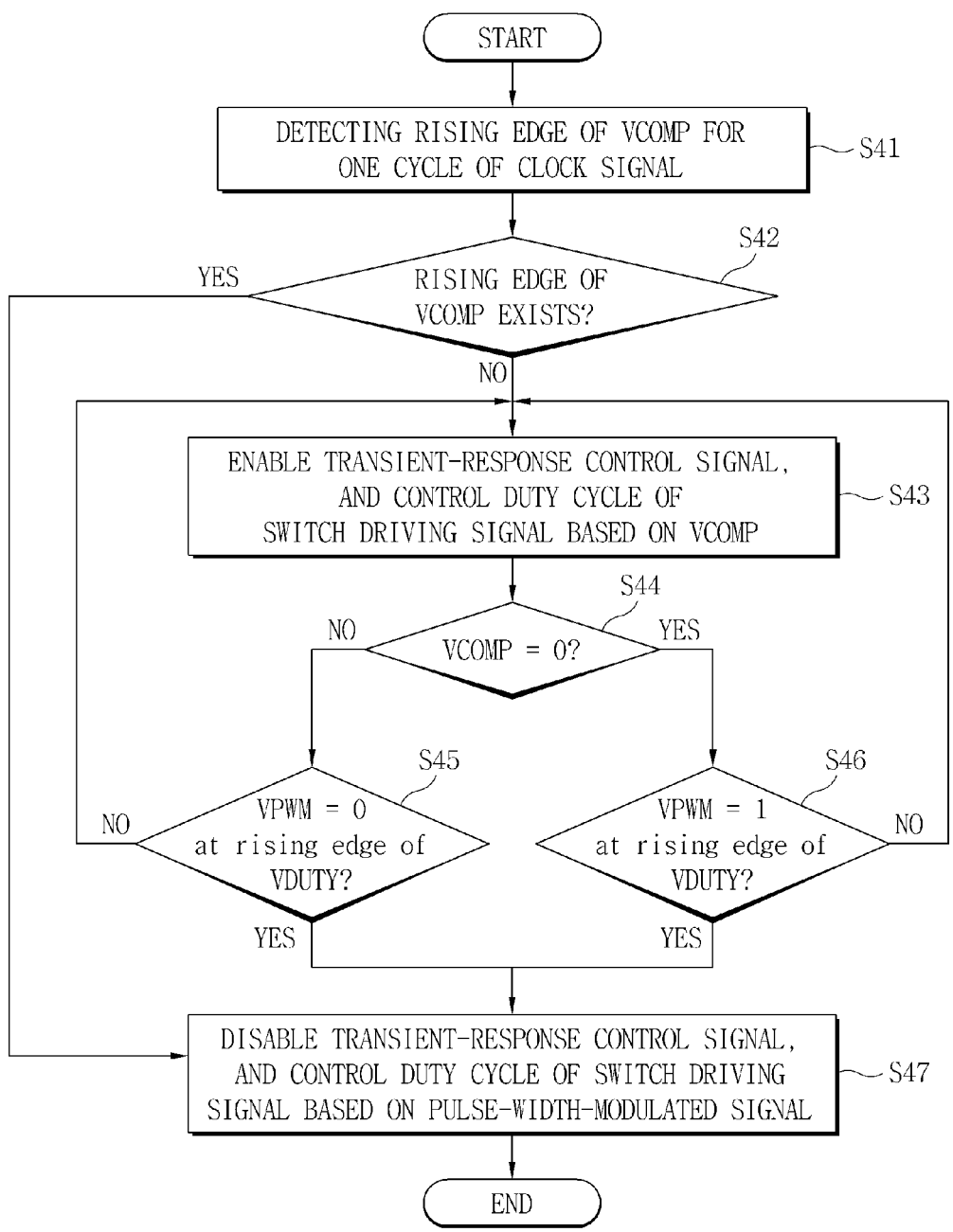
FIG. 17 is a flowchart illustrating the generating of the switch driving signal in the method of controlling a dual-mode switching D.C.-to-D.C. converter.

FIG. 17 is a flowchart illustrating the generating of the switch driving signal in the method of controlling a dual-mode switching D.C.-to-D.C. converter in FIG. 16.

Referring to FIG. 17, the method of generating of the switch driving signal in operation S4 may include the following operations.

In operation S41, the converter 100 may detect a rising edge of the comparison output signal for one cycle of a clock signal.

In operation S42, the converter 100 may determine whether the rising edge of the comparison output signal exists.

In operation S47, the converter 100 may disable a transient-response control signal when the rising edge of the comparison output signal exists, and control a duty cycle of the switch driving signal based on the pulse-width-modulated signal.

In operation S43, the converter 100 may enable the transient-response control signal, when the rising edge of the comparison output signal does not exist, and control the duty cycle of the switch driving signal based on the comparison output signal.

In operation S44, the converter 100 may determine whether value of the comparison output signal is a logic "0."

In operation S45, the converter 100) may determine whether value of the pulse-width-modulated signal is the logic "0" at a rising edge of a duty signal when the value of the comparison output signal is not the logic "0."

The converter 100 may perform operation S47 when the value of the pulse-width-modulated signal is the logic "0" at the rising edge of the duty signal, and perform operation S43 when the value of the pulse-width-modulated signal is not the logic "0" at the rising edge of the duty signal.

In operation S46, the converter 100 may determine whether the value of the pulse-width-modulated signal is a logic "1" at the rising edge of the duty signal when the value of the comparison output signal is the logic "0."

The converter 100 may perform operation S47 when the value of the pulse-width-modulated signal is the logic "1" at the rising edge of the duty signal, and perform operation S43 when the value of the pulse-width-modulated signal is not the logic "1" at the rising edge of the duty signal.

Figure 18:
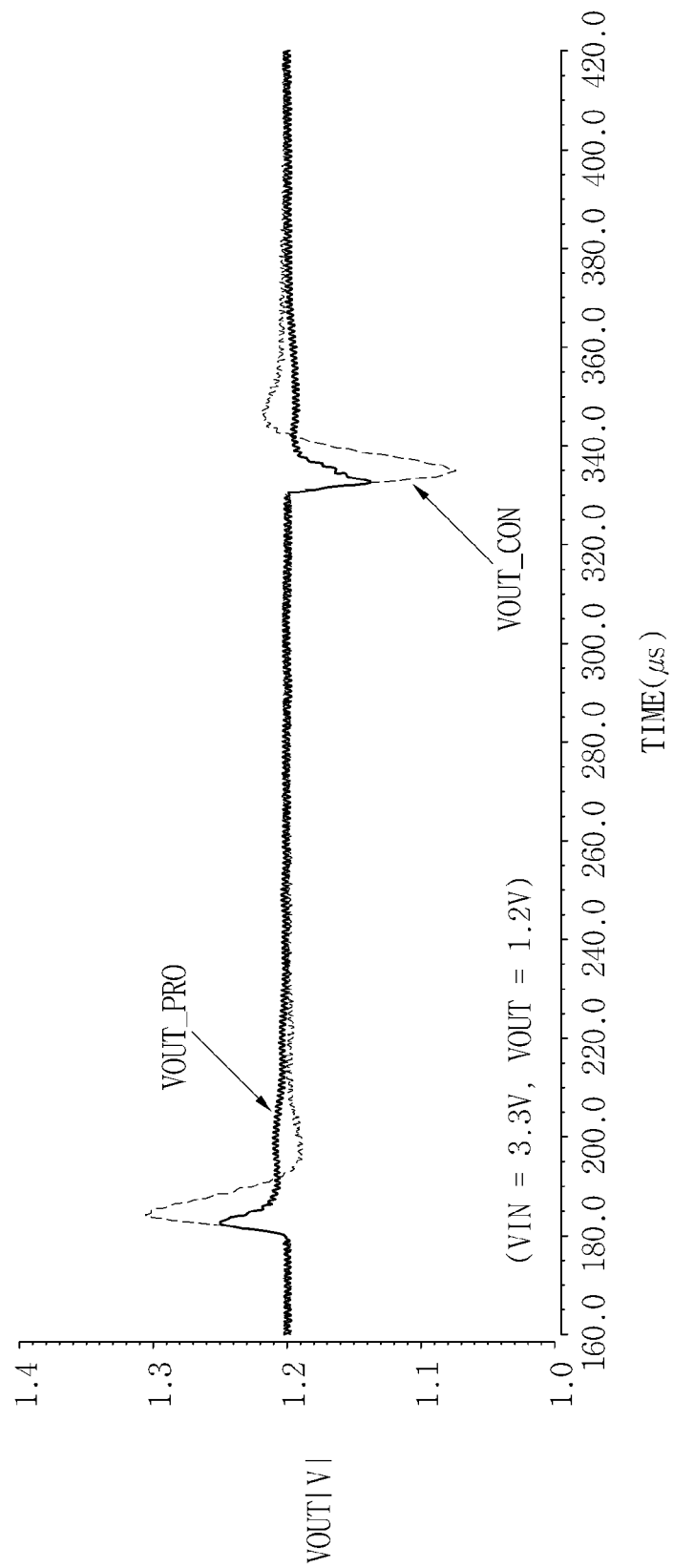
FIGS. 18 to 19 are simulation diagrams illustrating a transient response characteristic of a switching D.C.-to-D.C. converter in accordance with at least one example embodiment of inventive concepts.
Figure 19:
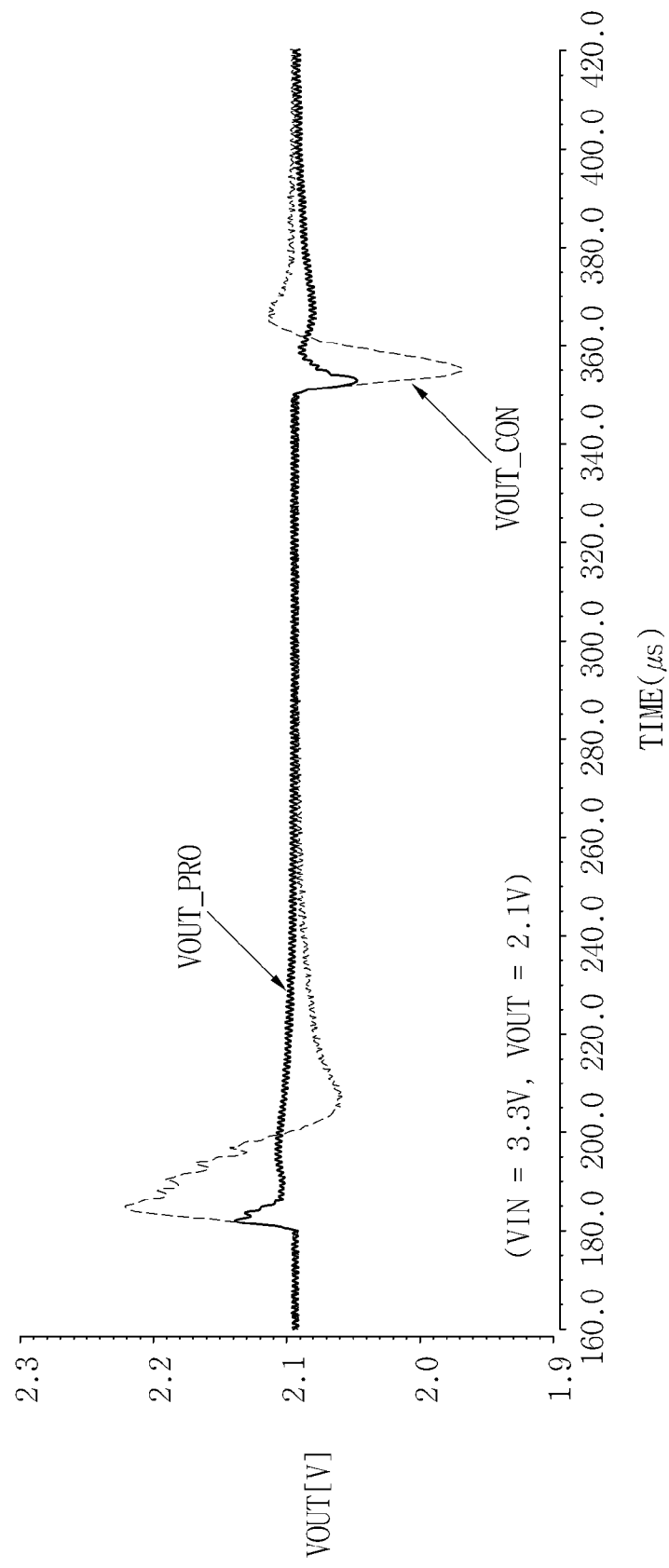

FIGS. 18 to 19 are simulation diagrams illustrating a transient response characteristic of a switching D.C.-to-D.C. converter in accordance at least one example embodiment of inventive concepts. FIG. 18 illustrates a waveform of the D.C. output voltage VOUT when the D.C. input voltage VIN is 3.3 V, the D.C. output voltage VOUT is 1.2 V, and the load current of a buck converter increases from 500 μA to 1 mA and then decreases to 500 μA. FIG. 19 illustrates a waveform of the D.C. output voltage VOUT when the D.C. input voltage VIN is 3.3 V, the D.C. output voltage VOUT is 2.1 V, and the load current of a buck converter increases from 500 μA to 1 mA and then decreases to 500 μA. However, it should be understood that these are example values and that inventive concepts are not limited thereto. For example, a buck converter according to at least one example embodiment may be configured to account for other amounts of change in load current based on desired transient-response characteristics. In FIGS. 18 and 19, VOUT_PRO refers to the waveform generated by a buck converter according to at least one example embodiment while VOUT_CON refers to the waveform generated by a conventional buck converter.

Referring to FIGS. 18 and 19, the switching D.C.-to-D.C. converter according to at least one example embodiment of inventive concepts may include the DTC 151, and use different feedback paths for a normal operating mode and an abnormal operating mode. Therefore, in the D.C. output voltage VOUT of the switching D.C.-to-D.C. converter according to at least one example embodiment of inventive concepts, a fluctuation of the D.C. output voltage VOUT and a recovery time is decreased when compared with the conventional switching D.C.-to-D.C. converter.

The switching D.C.-to-D.C. converter according to at least one example embodiment of inventive concepts may generate a stable D.C. output voltage even when a load is changed because the switching D.C.-to-D.C. converter operates in a fast transient-response mode during an abnormal operation when a transient change in the D.C. output voltage occurs. Particularly, the switching D.C.-to-D.C. converter according to at least one example embodiment of inventive concepts may be applied to a variety of switching D.C.-to-D.C. converters by changing a duty ratio of a clock signal. Therefore, the switching D.C.-to-D.C. converter may have a high operating stability and high response speed.

At least one example embodiment of inventive concepts may be applied to a power converter, and particularly, to a switching D.C.-to-D.C. converter.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages. Accordingly, all such modifications are intended to be included within the scope of inventive concepts as defined in the claims. In the claims, means-plus-function clauses are intended to cover the structures described herein as performing the recited function, and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A switching D.C.-to-D.C. converter, comprising:
    a power converter configured to generate a D.C. output voltage based on at least one switch driving signal and a D.C. input voltage; and
    a switch driver configured to,
        perform frequency compensation on the D.C. output voltage to generate a feedback voltage,
        compare the feedback voltage with a comparison input signal to generate a pulse-width-modulated signal,
        compare the D.C. output voltage with a reference voltage to generate a comparison output signal,
        generate the at least one switch driving signal based on the pulse-width-modulated signal in a normal operation mode, and
        generate the at least one switch driving signal based on the comparison output signal in an abnormal operation mode, the normal operation mode and the abnormal operation mode being based on a load current flowing through a load connected to the switching D.C.-to-D.C. converter,
    wherein the switch driver includes,
        a voltage divider configured to divide the D.C. output voltage to generate a voltage signal,
        a signal generator configured to generate a duty signal based on the D.C. input voltage and the reference voltage, the duty signal having a duty ratio that changes according to the comparison input signal, a clock signal, and the D.C. input voltage, the comparison input signal being a ramp signal,
        a frequency compensation circuit configured to perform the frequency compensation on the voltage signal to generate the feedback voltage,
        a first comparator configured to compare the feedback voltage with the comparison input signal to generate the pulse-width-modulated signal,
        a transient-response feedback circuit configured to compare the D.C. output voltage with the reference voltage to generate the comparison output signal, and generate a transient-response control signal based on the clock signal, the duty signal, the pulse-width-modulated signal, and the comparison output signal, the transient-response feedback circuit including a pre-amplifier and a second comparator, the pre-amplifier configured to amplify a difference between the D.C. output voltage and the reference voltage to generate a differential output signal pair, the second comparator configured to compare the differential output signal pair to each other to generate the comparison output signal,
        a selecting circuit configured to select one of the pulse-width-modulated signal and the comparison output signal in response to the transient-response control signal, and output the selected signal as a gate control signal, and
        a gate driver configured to generate the at least one switch driving signal based on the gate control signal.

2. The switching D.C.-to-D.C. converter of claim 1, wherein the abnormal operation mode is a mode in which a transient change in a level of the D.C. output voltage occurs due to a change in the load current, and the normal operation mode is a mode in which the level of the D.C. output voltage is constant due to the load current being constant.

3. The switching D.C.-to-D.C. converter of claim 1, wherein
    the at least one switching driving signal includes a first driving signal and a second driving signal, and
    the power converter comprises,
        a first power switch connected between a first node and a second node, and configured to operate in response to the first driving signal,
        a second power switch connected between the second node and a ground voltage, and configured to operate in response to the second driving signal,
        an inductor connected between the second node and an output node, and
        a capacitor connected between the output node and the ground voltage.

4. The switching D.C.-to-D.C. converter of claim 1, wherein the signal generator comprises:
    a second comparator configured to compare the ramp signal with a lower limit to generate a first comparison output;
    a third comparator configured to compare the ramp signal with an upper limit to generate a second comparison output;
    a flip-flop configured to generate the clock signal based on the first comparison output and the second comparison output; and a fourth comparator configured to compare the ramp signal with the voltage signal and generate the duty signal, the duty ratio of the voltage signal varying according to the D.C. input voltage.

5. The switching D.C.-to-D.C. converter of claim 1, wherein the transient-response feedback circuit comprises:
a second comparator configured to compare the D.C. output voltage with the reference voltage to generate the comparison output signal; and
a transient-response control circuit configured to generate the transient-response control signal based on the clock signal, the duty signal, the pulse-width-modulated signal, and the comparison output signal.

6. The switching D.C.-to-D.C. converter of claim 1, wherein the transient-response feedback circuit is configured to detect the comparison output signal using the clock signal, and detect the pulse-width-modulated signal using the duty signal.

7. The switching D.C.-to-D.C. converter of claim 1, wherein the transient-response feedback circuit is configured to enable the transient-response control signal if a pulse of the comparison output signal is not generated for one period of the clock signal.

8. The switching D.C.-to-D.C. converter of claim 1, wherein the selecting circuit is configured to output the comparison output signal as the gate control signal if the transient-response control signal is enabled, and output the pulse-width-modulated signal as the gate control signal if the transient-response control signal is disabled.

9. The switching D.C.-to-D.C. converter of claim 1, wherein the transient-response feedback circuit is configured to enable the transient-response control signal such that the D.C.-to-D.C. converter has a desired transient-response characteristic.

10. The switching D.C.-to-D.C. converter of claim 1, wherein the transient-response feedback circuit is configured to sample the pulse-width-modulated signal at a rising edge of the duty signal, and if a result of the sampling indicates that a logic state of the pulse-width-modulated signal changes from a first state to a second state, disable the transient-response control signal.

11. The switching D.C.-to-D.C. converter of claim 1, wherein the normal operation mode is a mode in which the transient-response control signal is disabled.

12. The switching D.C.-to-D.C. converter of claim 1, wherein the transient-response feedback circuit comprises:
a pre-amplifier configured to amplify a difference between the D.C. output voltage and the reference voltage to generate a differential output signal pair;
a second comparator configured to compare signals of the differential output signal pair to each other to generate the comparison output signal; and
a transient-response control circuit configured to generate the transient-response control signal based on the clock signal, the duty signal, the pulse-width-modulated signal, and the comparison output signal.

13. The switching D.C.-to-D.C. converter of claim 1, wherein the transient-response feedback circuit further includes a first resistor, a third resistor, a second resistor, and a first capacitor, the first resistor having a first terminal and a second terminal, the first terminal of the first resistor configured to receive the D.C. output voltage and the second terminal of the first resistor connected to a first input terminal of the pre-amplifier, the first capacitor connected between the second terminal of the first resistor and a ground voltage, the second resistor having a first terminal and a second terminal, the first terminal of the second resistor configured to receive the reference voltage, and a second terminal of the second resistor connected to a second input terminal of the pre-amplifier, the third resistor connected between the reference voltage and the ground voltage.

14. A device, comprising:
a power converter configured to generate a D.C. output voltage based on at least one switch driving signal and a D.C. input voltage; and
a switch driver configured to,
perform frequency compensation on the D.C. output voltage to generate a feedback signal,
generate a first control signal and a second control signal, the first control signal being generated based on the feedback signal and a first reference signal, the second control signal being generated based on the D.C. output voltage and a second reference signal,
select one of the first control signal and the second control signal based on an operation mode of the device, the operation mode being based on a load current flowing through a load connected to the device, and
generate the at least one switch driving signal based on a selected of the first control signal and the second control signal,
wherein the switch driver includes,
a voltage divider configured to divide the D.C. output voltage to generate a voltage signal,
a signal generator configured to generate a duty signal based on the D.C. input voltage and the second reference signal, the duty signal having a duty ratio that changes according to the first reference signal, a clock signal, and the D.C. input voltage,
a frequency compensation circuit configured to perform the frequency compensation on the voltage signal to generate the feedback signal,
a first comparator configured to compare the feedback signal with the first reference signal to generate a pulse-width-modulated signal as the first control signal,
a transient-response feedback circuit configured to compare the D.C. output voltage with the second reference voltage to generate a comparison output signal as the second control signal, and generate a transient-response control signal based on the clock signal, the duty signal, the pulse-width-modulated signal, and the comparison output signal, the transient-response feedback circuit including a pre-amplifier and a second comparator, the pre-amplifier configured to amplify a difference between the D.C. output voltage and the reference voltage to generate a differential output signal pair, the second comparator configured to compare the differential output signal pair to each other to generate the comparison output signal, and
a selecting circuit configured to select one of the pulse-width-modulated signal and the comparison output signal in response to the transient-response control signal based on the operation mode of the device.

15. The device of claim 14, wherein the switch driver is configured to select the first control signal if the operation mode indicates that the load current is constant.

16. The device of claim 15, wherein the switch driver is configured to select the second control signal if the operation mode indicates that the load current changes.

17. The device of claim 14, wherein the switch driver is configured to detect the operation mode based on a clock signal and a duty signal.

18. The device of claim 14, wherein the first reference signal is a ramp signal.

19. The device of claim 14, wherein the transient-response feedback circuit further includes a first resistor, a third resistor, a second resistor, and a first capacitor, the first resistor having a first terminal and a second terminal, the first terminal of the first resistor configured to receive the D.C. output voltage and the second terminal of the first resistor connected to a first input terminal of the pre-amplifier, the first capacitor connected between the second terminal of the first resistor and a ground voltage, the second resistor having a first terminal and a second terminal, the first terminal of the second resistor configured to receive the reference voltage, and a second terminal of the second resistor connected to a second input terminal of the pre-amplifier, the third resistor connected between the reference voltage and the ground voltage.

\* \* \* \* \*